US012685958B2

(12) United States Patent
Wood et al.

(10) Patent No.: US 12,685,958 B2
(45) Date of Patent: Jul. 21, 2026

(54) CARBON DIOXIDE CAPTURE PROCESS USING HYDROGELS

(71) Applicant: Commonwealth Scientific and Industrial Research Organisation, Acton (AU)

(72) Inventors: Colin D. Wood, Acton (AU); Matthew B. Myers, Acton (AU); Cameron White, Acton (AU)

(73) Assignee: Commonwealth Scientific and Industrial Research Organisation, Acton (AU)

(*) Notice: Subject to any disclaimer, the term of this patent is extended or adjusted under 35 U.S.C. 154(b) by 861 days.

(21) Appl. No.: 17/801,941

(22) PCT Filed: Jul. 17, 2020

(86) PCT No.: PCT/AU2020/050740

§ 371 (c)(1),
(2) Date: Aug. 24, 2022

(87) PCT Pub. No.: WO2021/168498

PCT Pub. Date: Sep. 2, 2021

(65) Prior Publication Data

US 2023/0277973 A1 Sep. 7, 2023

(30) Foreign Application Priority Data

Feb. 28, 2020 (AU) ................................ 2020900582

(51) Int. Cl.

| | |
|---|---|
| ***B01D 53/62*** | (2006.01) |
| ***B01D 53/02*** | (2006.01) |
| ***B01D 53/24*** | (2006.01) |
| ***B01D 53/60*** | (2006.01) |
| ***B01J 20/26*** | (2006.01) |
| ***B01J 20/28*** | (2006.01) |
| ***B01J 20/34*** | (2006.01) |
| ***C08G 73/02*** | (2006.01) |

(52) U.S. Cl.

CPC ............ *B01D 53/02* (2013.01); *B01J 20/262* (2013.01); *B01J 20/264* (2013.01); *B01J 20/267* (2013.01); *B01J 20/28047* (2013.01); *B01J 20/3466* (2013.01); *C08G 73/0206* (2013.01); *B01D 2253/202* (2013.01); *B01D 2257/504* (2013.01); *C08G 2210/00* (2013.01)

(58) Field of Classification Search

CPC ....... B01D 53/02; B01J 20/262; B01J 20/264; B01J 20/267; B01J 20/28047; B01J 20/3466; C08G 73/0206

See application file for complete search history.

(56) References Cited

FOREIGN PATENT DOCUMENTS

| | | |
|---|---|---|
| WO | WO 2012/158911 | 11/2012 |
| WO | WO 2018/094466 | 5/2018 |

OTHER PUBLICATIONS

Borhani et al., Renewable and Sustainable Energy Reviews, (2019), v.114, p. 109299 (1-20).*
Sujan et al., ACS Sustainable Chem. & Eng., p. 1-34.*
Xu et al., J. of Materials Chemistry A, (2018), v.6, p. 21468-21474.*
Chen et al "Preparation of a Solid Amine Microspherical Adsorbent with High CO2 Adsorption Capacity" Langmuir, 2020, vol. 36, pp. 7715-7723. Published Jan. 19, 2020.
Nagai et al "Synthesis of Hydrogels from Polyallylamine with Carbon Dioxide as Gellant: Development of Reversible CO2 Absorbent." Macromol. Rapid Commun. 2011, vol. 32, pp. 404-410.
Xu et al "Polyethylenimine "Snow": An Emerging Material for Efficient Carbon Removal" ACS Appli. Mater. Interfaces, 2019, vol. 11, pp. 26770-26780.
Sakwa-Novak et al., "Role of Additives in Composite PEI/Oxide CO2 Adsorbents: Enhancement in the Amine Efficiency of Supported PEI by PEG in CO2 Capture from Simulated Ambient Air." ACS Appli. Mater. Interfaces, 2015, vol. 7, pp. 24748-24759.
Wang, Jitong, et al., "Application of Polyethylenimine-Impregnated Solid Adsorbents for Direct Capture of Low-Concentration CO2," AIChE Journal, vol. 61(3), Nov. 21, 2014, pp. 972-980.

* cited by examiner

*Primary Examiner* — Yong L Chu
(74) *Attorney, Agent, or Firm* — Squire Patton Boggs (US) LLP

(57) ABSTRACT

The present application is directed to processes for removing carbon dioxide ($CO_2$) from low $CO_2$ concentration gaseous streams. The process comprises contacting the gaseous stream with a hydrogel for absorbing at least some $CO_2$ from the gaseous stream. The hydrogel comprises a cross-linked hydrophilic polymer comprising a hydrophilic polymer cross-linked with a cross-linking agent. Processes for preparing the hydrogel, types of hydrogels, using the hydrogel to remove $CO_2$ from gaseous streams, and regenerating the hydrogel to recover absorbed $CO_2$ from the hydrogel are also disclosed.

21 Claims, 18 Drawing Sheets

CARBON DIOXIDE CAPTURE PROCESS USING HYDROGELS

CROSS-REFERENCE TO RELATED APPLICATIONS

The present application is a national stage filing under 35 U.S.C. 371 of PCT/AU2020/050740, filed Jul. 17, 2020, which International Application was published by the International Bureau in English on Sep. 2, 2021, as WO 2021/168498, and application claims priority from Australian Provisional Patent Application No. 2020900582, filed on Feb. 28, 2020, which applications are hereby incorporated by reference in their entirety in this application.

FIELD

The present disclosure relates to processes for capturing carbon dioxide ($CO_2$) from a low $CO_2$ concentration gaseous stream. In particular, the present disclosure relates to the use of hydrogels to absorb $CO_2$ from a low $CO_2$ concentration gaseous stream, such as by using polyamine hydrogels.

BACKGROUND

Various approaches have been used for direct air capture of $CO_2$ including the use of liquid and solid-based sorbents. Liquids that are employed typically involve hydroxide solutions, which chemically react with the $CO_2$. However, the rate of uptake and energy requirements to regenerate the materials are challenging. In addition, there are issues with corrosion caused by highly alkaline liquids. There are a number of emerging solid materials that can be used including amine supported porous supports and metal organic frameworks. Whilst these materials offer lower regeneration energies compared to hydroxide solutions, the cost of synthesis can be high and some of these materials are sensitive to the presence of water vapour or other components of the gas.

There is a need to provide alternative approaches, such as an approach that can combine the advantages of liquids (high selectivity for $CO_2$ and low cost) with those of solids (low regeneration energy and high rate of uptake).

SUMMARY

The present inventors have undertaken research and development into processes for removing carbon dioxide ($CO_2$) from gaseous streams using hydrogels. The hydrogel composition can be tailored to provide control over the $CO_2$ absorption efficiency. In particular, the hydrogels can remove $CO_2$ from a low $CO_2$ concentration gaseous stream by absorbing $CO_2$ within the hydrogel, thereby removing it from the gaseous stream. The absorbed $CO_2$ can then be harvested from the hydrogel, and the regenerated hydrogel can be reused to absorb more $CO_2$ (e.g. recycled). The present disclosure described herein can also be scalable for industrial application, and may find use particularly in direct air capture. The present processes using a selection of cross-linked hydrogels can combine the advantages of liquids (high selectivity for $CO_2$ and low cost) with those of solids (low regeneration energy and high rate of uptake). At least according to some examples and embodiments as described herein, the hydrogels have also been found to be tolerant to the presence of water and can absorb $CO_2$ under a broad range of conditions (e.g. including humidity).

In one aspect, there is provided a process for removing carbon dioxide ($CO_2$) from a low $CO_2$ concentration gaseous stream having a $CO_2$ concentration of less than about 100,000 ppm, comprising:

- contacting the gaseous stream with a hydrogel for absorbing at least some $CO_2$ from the gaseous stream,
- wherein the hydrogel comprises a cross-linked hydrophilic polymer comprising a hydrophilic polymer cross-linked with a cross-linking agent.

In an embodiment, the cross-linked hydrophilic polymer comprises a polyamine or a copolymer thereof. In one embodiment, the polyamine or copolymer thereof is cross-linked with between about 0.01 mol % to about 50 mol % cross-linking agent. In one embodiment, the hydrophilic polymer is polyethylenimine (PEI). In one embodiment, the hydrogel comprises a cross-linked polyethylenimine (PEI).

In another embodiment, the cross-linked hydrophilic polymer comprises a polyacrylamide or a copolymer thereof. In one embodiment, the polyacrylamide or copolymer thereof is cross-linked with between about 0.01 mol % to about 50 mol % cross-linking agent. In one embodiment, the hydrophilic polymer is polyacrylamide, poly(acrylamide-co-acrylic acid), poly(acrylamide-co-acrylic acid) partial potassium salt, poly(acrylamide-co-acrylic acid) partial sodium salt, poly(acrylamide-co-methylenebisacrylamide) or poly(acrylamide-co-ethylene glycol dimethacrylate).

In an embodiment, the hydrogel is provided as a plurality of particles. In one embodiment, the hydrogel is a self-supported hydrogel (e.g. the hydrogel is able to maintain its morphology and absorptive capacity in the absence of a support material). In an embodiment, the hydrogel comprises a liquid swelling agent. The liquid swelling agent may be water or non-aqueous solvent, for example a polar solvent. The polar solvent may also be capable of binding or dissolving $CO_2$.

In an embodiment, the gaseous stream has a $CO_2$ concentration of less than about 1,000 ppm. In another embodiment, the gaseous stream has a $CO_2$ concentration of less than about 500 ppm. In another embodiment, the gaseous stream has a $CO_2$ concentration essentially equivalent to the $CO_2$ concentration in ambient air (e.g. current atmospheric conditions provides approximately 415 ppm, which is increasing due to anthropogenic emissions). In one embodiment, the gaseous stream is ambient air. In an embodiment, the process is direct air capture (DAC).

It will be appreciated that other aspects, embodiments and examples of the hydrogels, gaseous streams, processes and systems are described herein.

BRIEF DESCRIPTION OF FIGURES

FIG. 21: Direct air capture (DAC) using polyacrylamide hydrogels.

DETAILED DESCRIPTION

Figure 1:
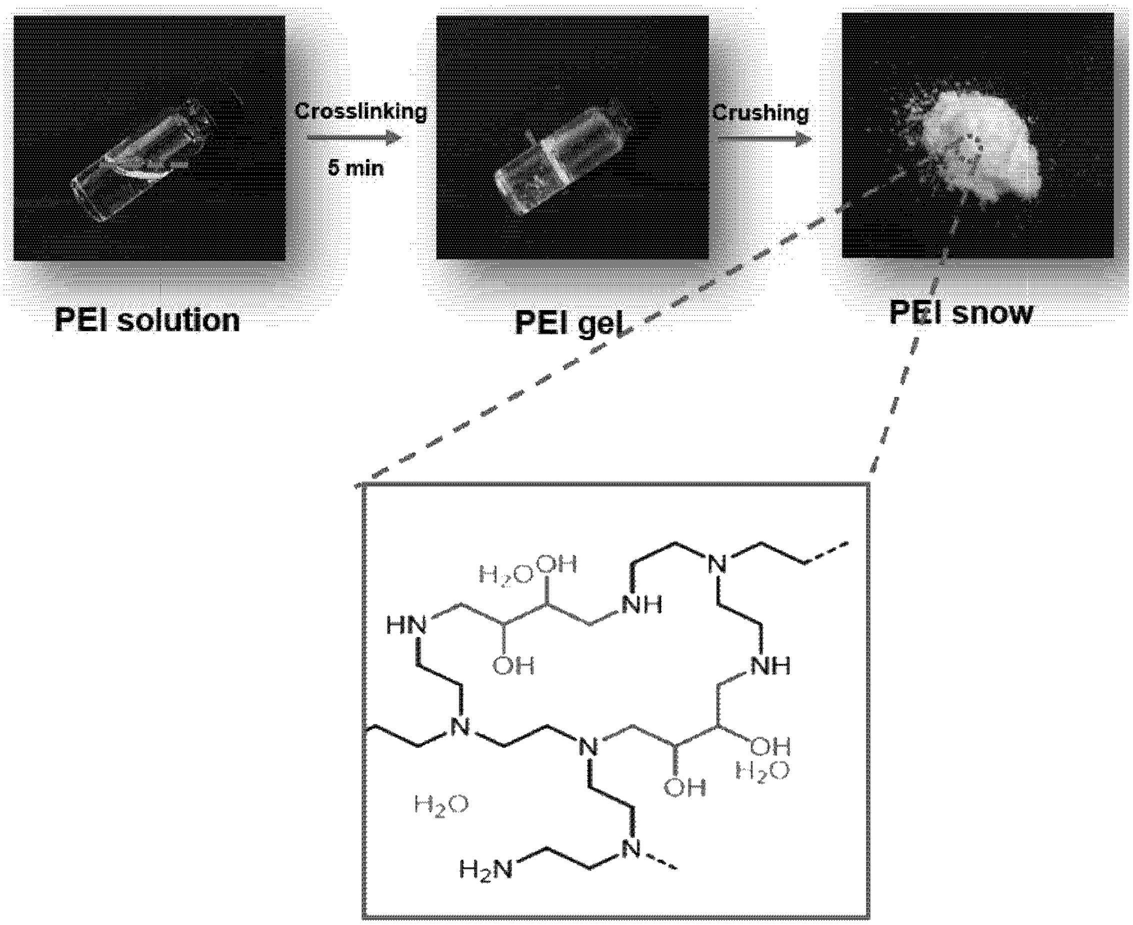
FIG. 1: Illustration of the fabrication and structure of a PEI hydrogel according to one embodiment.

The present disclosure describes the following various non-limiting embodiments, which relates to investigations undertaken to identify processes for removing carbon dioxide ($CO_2$) from gaseous streams (e.g. atmosphere) using hydrogels. It was surprisingly found that hydrogels could be used to absorb $CO_2$ from low $CO_2$ concentration gaseous streams. The hydrogels comprise a cross-linked hydrophilic polymer which can absorb and retain $CO_2$. The captured $CO_2$ can be removed from the hydrogel, and the regenerated hydrogel can be reused as an adsorbent material to capture $CO_2$ from low $CO_2$ concentration environments.

Terms

In the following description, reference is made to the accompanying drawings which form a part hereof, and which is shown, by way of illustration, several embodiments. It is understood that other embodiments may be utilized and structural changes may be made without departing from the scope of the present disclosure.

With regards to the definitions provided herein, unless stated otherwise, or implicit from context, the defined terms and phrases include the provided meanings. Unless explicitly stated otherwise, or apparent from context, the terms and phrases below do not exclude the meaning that the term or phrase has acquired by a person skilled in the relevant art. The definitions are provided to aid in describing particular embodiments, and are not intended to limit the claimed invention, because the scope of the invention is limited only by the claims. Furthermore, unless otherwise required by context, singular terms shall include pluralities and plural terms shall include the singular.

All publications discussed and/or referenced herein are incorporated herein in their entirety.

Any discussion of documents, acts, materials, devices, articles or the like which has been included in the present specification is solely for the purpose of providing a context for the present disclosure. It is not to be taken as an admission that any or all of these matters form part of the prior art base or were common general knowledge in the field relevant to the present disclosure as it existed before the priority date of each claim of this application.

Throughout this disclosure, unless specifically stated otherwise or the context requires otherwise, reference to a single step, composition of matter, group of steps or group of compositions of matter shall be taken to encompass one and a plurality (i.e., one or more) of those steps, compositions of matter, groups of steps or groups of compositions of matter. Thus, as used herein, the singular forms “a”, “an” and “the” include plural aspects unless the context clearly dictates otherwise. For example, reference to “a” includes a single as well as two or more; reference to “an” includes a single as well as two or more; reference to “the” includes a single as well as two or more and so forth.

Those skilled in the art will appreciate that the disclosure herein is susceptible to variations and modifications other than those specifically described. It is to be understood that the disclosure includes all such variations and modifications. The disclosure also includes all of the examples, steps, features, methods, compositions, coatings, processes, and coated substrates, referred to or indicated in this specification, individually or collectively, and any and all combinations or any two or more of said steps or features.

The term “and/or”, e.g., “X and/or Y” shall be understood to mean either “X and Y” or “X or Y” and shall be taken to provide explicit support for both meanings or for either meaning.

Unless otherwise indicated, the terms “first,” “second,” etc. are used herein merely as labels, and are not intended to impose ordinal, positional, or hierarchical requirements on the items to which these terms refer. Moreover, reference to a “second” item does not require or preclude the existence of lower-numbered item (e.g., a “first” item) and/or a higher-numbered item (e.g., a “third” item).

As used herein, the phrase “at least one of”, when used with a list of items, means different combinations of one or more of the listed items may be used and only one of the items in the list may be needed. The item may be a particular object, thing, or category. In other words, “at least one of” means any combination of items or number of items may be used from the list, but not all of the items in the list may be required. For example, “at least one of item A, item B, and item C” may mean item A; item A and item B; item B; item A, item B, and item C; or item B and item C. In some cases, “at least one of item A, item B, and item C” may mean, for example and without limitation, two of item A, one of item B, and ten of item C; four of item B and seven of item C; or some other suitable combination.

As used herein, the term “about”, unless stated to the contrary, typically refers to +/−10%, for example +/−5%, of the designated value.

It is to be appreciated that certain features that are, for clarity, described herein in the context of separate embodiments, may also be provided in combination in a single embodiment. Conversely, various features that are, for brevity, described in the context of a single embodiment, may also be provided separately or in any sub-combination.

Throughout the present specification, various aspects and components of the invention can be presented in a range format. The range format is included for convenience and should not be interpreted as an inflexible limitation on the scope of the invention. Accordingly, the description of a range should be considered to have specifically disclosed all the possible sub-ranges as well as individual numerical values within that range, unless specifically indicated. For example, description of a range such as from 1 to 5 should be considered to have specifically disclosed sub-ranges such as from 1 to 3, from 1 to 4, from 1 to 5, from 2 to 4, from 2 to 5, from 3 to 5 etc., as well as individual and partial numbers within the recited range, for example, 1, 2, 3, 4, 5, 5.5 and 6, unless where integers are required or implicit from context. This applies regardless of the breadth of the disclosed range. Where specific values are required, these will be indicated in the specification.

Throughout this specification the word “comprise”, or variations such as “comprises” or “comprising”, will be understood to imply the inclusion of a stated element, integer or step, or group of elements, integers or steps, but not the exclusion of any other element, integer or step, or group of elements, integers or steps.

The reference to “substantially free” generally refers to the absence of that compound or component in the composition other than any trace amounts or impurities that may be present, for example this may be an amount by weight % in the total composition of less than about 1%, 0.1%, 0.01%, 0.001%, or 0.0001%. The compositions as described herein may also include, for example, impurities in an amount by weight % in the total composition of less than about 5%, 4%, 3%, 2%, 1%, 0.5%, 0.1%, 0.01%, 0.001%, or 0.0001%. For example, this may be an amount by vol. % in the total gaseous stream of less than about 0.001%, or 0.0001%. For example, the gaseous streams as described herein may also include, for example, impurities in an amount by vol. % in the total gaseous stream of less than about 0.01%, 0.001%, or 0.0001%. An example of such an impurity is the amount of methane ($CH_4$) that may be present in air, being present in an amount of less than 0.0005 vol. %.

The term “alkyl” or “alyklene” includes straight-chained, branched, and cyclic alkyl groups and includes both unsubstituted and substituted alkyl groups. In one example, the alkyl groups are straight-chained and/or branched, and optionally interrupted by 1-3 cyclic alkyl groups. Unless otherwise indicated, the alkyl groups typically contain from 1 to 30 carbon atoms. The alkyl groups may for example contain carbon atoms from 1 to 20, 1 to 15, 1 to 12, 1 to 10, or 1 to 8. Examples of “alkyl” as used herein include, but are not limited to, methyl, ethyl, n-propyl. n-butyl, n-pentyl, isobutyl, t-butyl, isopropyl, n-octyl, n-heptyl, ethylhexyl, cyclopentyl, cyclohexyl, cyclo heptyl, adamantyl, and norbornyl, and the like. Unless otherwise noted, alkyl groups may be mono- or polyvalent. The alkyl groups may be optionally substituted and/or optionally interrupted by one or more heteroatoms. The alkyl groups may be referred to as “-alkyl-” in relation to use as a bivalent or polyvalent linking group.

The term “cycloalkyl” represents a mono-, bicyclic, or tricyclic carbocyclic ring system of from about 3 to about 30 carbon atoms, e.g., cyclopropyl, cyclobutyl, cyclopentyl, cyclohexyl or cycloheptyl. The cycloalkyl groups may be referred to as “-cycloalkyl-” in relation to use as a bivalent or polyvalent linking group.

The term “heteroalkyl” represents an alkyl group as defined supra comprising one or more heteroatoms, for example wherein the alkyl group is interrupted with one or more (e.g. 1 to 5 or 1 to 3) heteroatoms. It will be appreciated that heteroatoms may include O, N, S, or Si. In one example the heteroatoms is O. The heteroalkyl groups may be referred to as “-heteroalkyl-” in relation to use as a bivalent or polyvalent linking group.

The term “aryl” whether used alone, or in compound words such as arylalkyl, represents: (i) an optionally substituted mono-, bicyclic or tricyclic aromatic carbocyclic moiety of about 6 to about 30 carbon atoms, such as phenyl, naphthyl, or triphenyl; or, (ii) an optionally substituted partially saturated bicyclic carbocyclic aromatic ring system in which an aryl and a cycloalkyl or cycloalkenyl group are fused together to form a cyclic structure such as a tetrahydronaphthyl ring. The aryl groups may be referred to as “-aryl-” in relation to use as a bivalent or polyvalent linking group.

The term "arylalkyl" represents a -R-aryl group where the R group is an alkyl group, and the alkyl and aryl groups are each defined supra. The arylalkyl groups may be referred to as "-arylalkyl-" in relation to use as a bivalent or polyvalent linking group.

The term "heteroarylalkyl" represents a -R-aryl group where the R group is an alkyl group, and the alkyl and aryl groups are each defined supra, which is interrupted by one or more heteroatoms and optionally substituted as described herein. The heteroarylalkyl groups may be referred to as "-heteroarylalkyl-" in relation to use as a bivalent or polyvalent linking group.

As used herein, the terms "halo" or "halogen", whether employed alone or in compound words such as haloalkyl, means fluorine, chlorine, bromine or iodine.

As used herein, the term "haloalkyl" means an alkyl group having at least one halogen substituent, the terms "alkyl" and "halogen" being understood to have the meanings outlined above. Similarly, the term "monohaloalkyl" means an alkyl group having a single halogen substituent, the term "dihaloalkyl" means an alkyl group having two halogen substituents and the term "trihaloalkyl" means an alkyl group having three halogen substituents. Examples of monohaloalkyl groups include fluoromethyl, chloromethyl, bromomethyl, fluoromethyl, fluoropropyl and fluorobutyl groups; examples of dihaloalkyl groups include difluoromethyl and difluoroethyl groups; examples of trihaloalkyl groups include trifluoromethyl and trifluoroethyl groups.

As used herein, the term "cyano" represents a —CN moiety.

As used herein, the term "hydroxyl" represents a —OH moiety.

As used herein, the term "alkoxy" represents an —O-alkyl group in which the alkyl group is as defined supra. Examples include methoxy, ethoxy, n-propoxy, iso-propoxy, and the different butoxy, pentoxy, hexyloxy and higher isomers.

As used herein, the term "carboxyl" represents a C═O moiety.

As used herein, the term "carboxylic acid" represents a —$CO_2H$ moiety.

As used herein, the term "nitro" represents a —$NO_2$ moiety.

As used herein, the term "alkanolamine" represents a chemical compound that contains both hydroxyl (—OH) and amino (e.g. primary —$NH_2$, secondary —NHR and/or —tertiary —$NR_2$) functional groups on an alkane backbone.

As used herein, the term "polyamine" represents a compound having two or more amines (e.g. primary —$NH_2$, secondary —NHR, and/or tertiary —$NR_2$ amine) functional groups.

The term "polyalkylenimine" represents a compound comprising an alkylene backbone wherein one or more H atoms are substituted for an amino (e.g. primary —$NH_2$, secondary —NHR and/or —tertiary —$NR_2$) functional groups, and includes copolymers or derivatives thereof.

The term "polyacrylamide" represents a polymer comprising two or more acrylamide monomers, and includes copolymers or derivatives thereof, for example poly(acrylamide-co-acrylic acid).

The term "acrylamide" represents a compound with the chemical formula $CH_2$═$CHCNH_2$)

The term "acrylic acid" represents a compound with the formula $CH_2$═CHCOOH).

The term "acrylate" represents a salt, ester or conjugate base of acrylic acid. The acrylate ion is the anion $CH_2$═$CHCOO^-$. Examples include methyl acrylate, potassium acrylate and sodium acrylate.

The term "glycol" represents a class of compounds comprising two or more hydroxyl (—OH) groups, wherein the hydroxyl groups are attached to a different carbon atom.

The term "polyol" represents a compound containing two or more hydroxyl (—OH) groups.

The term "piperidine" represents a compound having the formula $(CH_2)_5NH$. The term "optionally substituted" means that a functional group is either substituted or unsubstituted, at any available position. The term "substituted" as referred to above or herein may include, but is not limited to, groups or moieties such as halogen, hydroxyl, amine, epoxide, nitro, carboxyl, carboxylic acid, cyano, or alkoxy.

The term "optionally interrupted" means a chain such as an alkyl chain may be interrupted by one or more (e.g. 1 to 3) functional groups such as amine, epoxide, carboxyl, carboxylic acid, and/or one or more heteroatoms such as N, S, Si, or O, at any position in the chain, for example to provide a heteroalkyl group. In one example, "optionally interrupted" means a chain such as an alkyl chain is interrupted by one or more (e.g. 1 to 3) heteroatoms such as N, S, or O.

Low $CO_2$ Concentration Gaseous Streams

The process of the present disclosure can remove $CO_2$ from low $CO_2$ concentration gaseous streams. For example, the process can remove $CO_2$ from a low $CO_2$ concentration atmosphere. Examples of low concentration gaseous streams include the atmosphere (e.g. ambient air), ventilated air (e.g. air conditioning units and building ventilation), and partly closed systems which recycle breathing air (e.g. submarines or rebreathers). In some embodiments, the low $CO_2$ concentration gaseous stream may have a $CO_2$ concentration of less than about 200,000 parts per million (ppm). In one embodiment, the low $CO_2$ concentration gaseous stream may have a $CO_2$ concentration of less than 150,000, 100,000, 75,000, 50,000, 25,000, 10,000, 5,000, 1,000, 900, 800, 700, 600, 500, 400, 300, 200 or 100 ppm. In another embodiment, the low $CO_2$ concentration gaseous stream may have a $CO_2$ concentration of between about 100 ppm to 100,000 ppm, about 100 ppm to about 10,000 ppm, about 100 ppm to about 1,000 ppm, or about 100 ppm to about 500 ppm. In one embodiment, the low $CO_2$ concentration gaseous stream may have a $CO_2$ concentration of between about 200 ppm to about 500 μm, such as about 400 to 450 ppm.

It will be understood that 1 ppm equates to 0.0001 vol. %. For example, a gaseous stream having a $CO_2$ concentration of less than about 100,000 ppm equates to 10.0 vol. % of $CO_2$ in the gaseous stream. Thus in some embodiments, the low $CO_2$ concentration gaseous stream may have a $CO_2$ concentration of less than about 20, 15, 10, 7.5, 5, 2.5, 1, 0.5, 0.1, 0.09, 0.08, 0.07, 0.06, 0.05, 0.04, 0.03, 0.02 or 0.01 vol. %. In another embodiment, the low $CO_2$ concentration gaseous stream may have a $CO_2$ concentration of between about 0.01 vol. % to about 10 vol. %, about 0.01 vol. % to about 1 vol. %, about 0.01 vol. % to about 0.1 vol. %, or 0.01 vol. % to about 0.05 vol. %. In one embodiment, the low $CO_2$ concentration gaseous stream may have a $CO_2$ concentration of between about 0.02 vol. % to about 0.05 vol. %, such as about 0.04 vol. %.

In one embodiment, the low $CO_2$ concentration gaseous stream may have a $CO_2$ concentration the same as in ambient air (e.g. the atmosphere). Thus in one embodiment, the low $CO_2$ concentration gaseous stream may have a $CO_2$ concentration of about 400 ppm to 450 ppm $CO_2$, for example about 400 ppm to 415 ppm as in ambient air in most locations around the world. Accordingly, in one embodiment, the process is for direct air capture (DAC).

In one embodiment, the gaseous stream may comprise less than 100 ppm (i.e. 0.01 vol. %) hydrocarbon gas. For example, the gaseous stream may comprise less than about 100, 75, 50, 25, 20, 15, 10, 5, 4, 3, or 2 ppm hydrocarbon gas. The term 'hydrocarbon gas' will be understood to refer to a gaseous mixture of hydrocarbon compounds including, but not limited to methane, ethane, ethylene, propane, and other C3+ hydrocarbons. For example, it will be understood by a person skilled in the art that ambient air comprises methane as a minor impurity (e.g. 2 ppm/0.0002 vol. %), and that ambient air therefore may comprise less than 3 ppm hydrocarbon gas. The low $CO_2$ concentration gaseous stream may comprise predominantly of nitrogen makes up the major vol. % proportion in the gaseous stream. For example, the low $CO_2$ concentration gaseous stream may comprise at least about 50 vol. % nitrogen, for example at least about 70 vol. % nitrogen. In one embodiment, the low $CO_2$ concentration gaseous stream comprises about 78 vol. % nitrogen (e.g. ambient air).

The low $CO_2$ concentration gaseous stream may comprise an amount of water (e.g. the gaseous stream is damp/moist for example a humid gaseous stream). For example, the low $CO_2$ concentration gaseous stream may comprise between about 1 vol. % to about 10 vol. % water. Alternatively, the low $CO_2$ concentration gaseous stream may be a dry gaseous stream.

In some embodiments, the gaseous stream originates from a ventilation system, for example building ventilation or air conditioning. In other embodiments, the gaseous stream originates from a closed, or at least partially closed system, designed to recycle breathing gas, for example in a submarine. It will be appreciated that the hydrogels of the present disclosure can also absorb $CO_2$ from gaseous streams with higher $CO_2$ concentrations, highlighting the versatility of the hydrogels for a wide range of air capture applications. However, it is the ability of the hydrogels to capture $CO_2$ at relatively low concentrations (e.g. 400 ppm) which the present inventors found particularly surprising.

The low $CO_2$ concentration gaseous stream is contacted with the hydrogel. The gaseous stream may have a suitable flow rate to contact (e.g. pass through) the hydrogel. Alternatively, the gaseous stream may come into contact with the hydrogel without any back pressure or flow rate being applied (e.g. the gaseous stream may organically diffuse into the hydrogel upon contact). In some embodiments, the gaseous stream may be an atmosphere surrounding the hydrogel, for example a low $CO_2$ concentration atmosphere. In some embodiments, the gaseous stream passes through the hydrogel (e.g. enters from a first side or face on the hydrogel and exits from different side or face) or it may simply diffuse into the hydrogel, for example when the hydrogel is placed in an atmosphere, such as ambient air. As such, it will be understood that in some embodiments the gaseous stream does not need to be applied with a back pressure to essentially force the gaseous stream "through" the hydrogel, although in some embodiments this may be desirable, such as when the hydrogel is configured to a building ventilation system, for example. In one embodiment, the gaseous stream (e.g. atmosphere) diffuses into the hydrogel upon contact with the hydrogel.

In some embodiments, the gaseous stream has no flow rate, e.g. 0 standard cubic centimetres per minute (sccm). In some embodiments, the gaseous stream has a flow rate of between about 100 standard cubic centimetres per minute (sccm) to about 100,000 sccm. In one embodiment, the gaseous stream has a flow rate of at least about 100, 500, 1000, 10,000 or 100,000 sccm. In another embodiment, the gaseous stream has a flow rate of less than about 100,000, 10,000, 1000, 500 or 100 sccm. Combinations of these flow rates to form various ranges are also possible, for example the gaseous stream may have a flow rate of between about 10,000 to about 100,000 sccm. It will be appreciated that the unit sccm can also be referred to as $cm^3$/min.

In some embodiments, the gaseous stream has a higher flow rate. In some embodiments, the gaseous stream has a flow rate of at least 1, 5, 10, 20, 50, 100, 500, 1,000, 5,000, 7,000, 10,000, 15,000, 17,000, 20,000, 30,000, 40,000, or 50,000 cubic metres per hour ($m^3$/hr). In some embodiments, the gaseous stream has a flow rate of less than 50,000, 40,000, 30,000, 20,000, 17,000, 15,000, 10,000, 7,000, 5,000, 1,000, 500, 100, 50, 20, 10, 5, or 1 $m^3$/hr. Combinations of these flow rates are also possible, for example between about 5,000 $m^3$/hr to about 40,000 $m^3$/hr, about 7,000 $m^3$/hr to about 30,000 $m^3$/hr, or about 10,000 $m^3$/hr to about 20,000 $m^3$/hour. Other combinations with the lower flow rates described above are also possible, for example between about 100 $cm^3$/min (0.006 $m^3$/hr) to about 50,000 $m^3$/hr or 100,000 $cm^3$/min (6 $m^3$/hr) to about 20,000 $m^3$/hr.

In some embodiments, increasing the flow rate of the gaseous stream as it contacts the hydrogel leads to a faster rate of $CO_2$ absorption and capture in the hydrogel. In some embodiments, the gaseous stream has no flow rate (e.g. an ambient atmosphere).

The low $CO_2$ concentration gaseous stream may be at least partially dried to remove at least some of the moisture ($H_2O$) present in the gaseous stream prior to contacting with the hydrogel. For example, the gaseous stream may be dried to a humidity of less than 10%, 8%, 6%, 4%, or 2%, or to a humidity between any two of these values, for example between about 1% and about 10%, about 1% and about 5%, about 1% and about 3%. The gaseous stream may be dried by any conventional means (e.g. passing through a hygroscopic material or contacted with a source of heat) and its humidity measured via protocols as described herein.

In some embodiments, the low $CO_2$ concentration gaseous stream has an initial $CO_2$ concentration prior to contacting the hydrogel, and has a final $CO_2$ concentration after contacting the hydrogel (also referred to herein as an effluent gaseous stream and/or effluent $CO_2$ concentration). It will be appreciated that as $CO_2$ is absorbed into the hydrogel from the gaseous stream, the concentration of $CO_2$ in the effluent stream will be lower than the initial $CO_2$ concentration of the gaseous stream prior to contact (e.g. passing through) with the hydrogel.

The concentration of $CO_2$ in the gaseous stream can be measured by any suitable means, for example an isotopic analyser (e.g. using a G2201-i Isotopic Analyzer (PICARRO) and/or infrared spectrometer (e.g. an in-line calibrated cavity ring-down IR spectrometer).

Hydrogels

The term "hydrogel" refers to a three-dimensional (3D) network of cross-linked hydrophilic polymers that can swell and hold a large amount of water and other liquids while maintaining the structure due to chemical or physical cross-linking of individual hydrophilic polymer chains. The hydrogel comprises a cross-linked hydrophilic polymer. The absorbed water/liquid is taken into the cross-linked hydrophilic polymeric matrix of the hydrogel through hydrogen bonding rather than being contained in pores from which the fluid could be eliminated by squeezing. Unlike other more complex inorganic scaffolds and supports, such as zeolites or metal organic frameworks (MOFs), after removing the solvent the hydrogel does not retain a measurable dry state porosity.

Hydrogels are capable of absorbing and retaining large amounts of a liquid swelling agent (such as water or a non-aqueous solvent) relative to its mass. In some embodiments, the hydrogel is capable of absorbing at least 5 times its own weight in fluid up to 300 times its own weight in fluid. The surface area within the hydrogel may be increased depending on the degree of swelling of the hydrogel. For example, the hydrogel may comprising a liquid swelling agent (such as water) which swells the hydrophilic polymer network of the hydrogels into a more open mobile structure with liquid-filled pores which may increase the accessibility of $CO_2$ to the reactive functional groups on the hydrophilic polymer. Hydrogels also have has a swelling capacity (sometimes referred to as the maximum swelling capacity), which essentially defines the swelling limit of the polymer.

The hydrogel may have a swelling capacity (i.e. is capable of absorbing) of between about 20 grams of liquid per gram of hydrogel (g/g) to about 200 g/g when measured using standard gravimetric analysis. The typical method to determine this is by taking a known weight of the dry hydrogel and swelling in an excess of liquid for a specified period of time (typically 48 hours). After which time the excess liquid is removed by filtration and the hydrogel weight is recorded to determine the swelling ratio. By way of example, to determine the swelling capacity of a hydrogel, a known mass (g) of a dry hydrogel is dispersed in a liquid swelling agent (such as water) for 48 hours at room temperature, after which any non-absorbed free liquid is removed, and the swollen hydrogel is weighed. The mass difference between the dry and swollen state of the hydrogel corresponds to the amount of the absorbed liquid, which is then calculated as a grams of liquid per gram of hydrogel (g/g).

In some embodiments, the hydrogel may have swelling capacity of at least about 1, 5, 10, 20, 30, 40, 50, 60, 70, 80, 90, 100, 150, or 200 g/g. In other embodiments, the hydrogel may have a swelling capacity of less than about 200, 150, 100, 90, 80, 70, 60, 50, 40, 30, 20, 10, 5 or 1 g/g. Combinations of these swelling capacity values to form various ranges are also possible, for example the hydrogel may have a swelling capacity of between about 20 g/g to about 100 g/g.

The swelling capacity of the hydrogel can also vary depending on the liquid swelling agent. For example, the hydrogel may have a different swelling capacity with water as the liquid swelling agent compared to glycerol as the liquid swelling agent. For example, the hydrogel may have a swelling capacity of between about 1 g/g to about 200 g/g, for example between about 20 g/g to about 200 g/g water. In some embodiments, the hydrogel may have swelling capacity of at least about 1, 5, 10, 20, 30, 40, 50, 60, 70, 80, 90, 100, 150, or 200 g/g water. In other embodiments, the hydrogel may have a swelling capacity of less than about 200, 150, 100, 90, 80, 70, 60, 50, 40, 30, 20, 10, 5 or 1 g/g water. Combinations of these swelling capacity values to form various ranges are also possible, for example the hydrogel may have a swelling capacity of between about 20 g/g to about 100 g/g water.

In another example, the hydrogel may have a swelling capacity of between about 1 g/g to about 200 g/g, for example between about 20 g/g to about 200 g/g glycerol. In some embodiments, the hydrogel may have swelling capacity of at least about 1, 5, 10, 20, 30, 40, 50, 60, 70, 80, 90, 100, 150, or 200 g/g glycerol. In other embodiments, the hydrogel may have a swelling capacity of less than about 200, 150, 100, 90, 80, 70, 60, 50, 40, 30, 20, 10, 5 or 1 g/g glycerol. Combinations of these swelling capacity values to form various ranges are also possible, for example the hydrogel may have a swelling capacity of between about 20 g/g to about 100 g/g glycerol. In some embodiments, the present inventors have surprisingly found that hydrogels having a lower swelling capacity (e.g. a swelling capacity of less than 200 g/g water when measured using gravimetric analysis) can absorb $CO_2$ from low $CO_2$ concentration gaseous streams.

The present inventors have found that, in some embodiments, a hydrogel that is swollen to (or close to) its swelling capacity with a liquid swelling agent may demonstrate increased $CO_2$ absorption when contacted with the low $CO_2$ concentration gaseous stream. In some embodiments, the hydrogel is swollen with a liquid swelling agent to between about 60% to about 99% of the hydrogels swelling capacity. For example, the hydrogel may be swollen to at least about 60, 70, 80, 90, 95, 98, or 99% of the hydrogels swelling capacity. The hydrogel may be swollen to less than about 99, 98, 95, 90, 80, 70, or 60% of the hydrogels swelling capacity. Combinations of these % values to form various ranges are also possible, for example the hydrogel may be swollen to between about 70% to about 98% of the hydrogels swelling capacity, for example between about 80% to about 95% of the hydrogels swelling capacity.

The hydrogel may be capable of swelling and retaining about 0.5 wt. % to about 99 wt. % liquid swelling agent. The liquid swelling agent may be strongly or weakly bound to the cross-linked hydrophilic polymer network within the hydrogel or may be non-bound. The amount of liquid swelling agent in the hydrogel can vary depending on the degree of swelling or dehydration of the hydrogel. For example, the hydrogel may comprise between 0.5 wt. % to about 99 wt. % liquid swelling agent. In some embodiments, the hydrogel may comprise at least about 0.5, 1, 5, 10, 20, 30, 40, 50, 60, 70, 80, 90, or 99 wt. % liquid swelling agent. In some embodiments, the hydrogel may comprise less than about 99, 90, 80, 70, 60, 50, 40, 30, 20, 10, 5, 1, or 0.5 wt. % liquid swelling agent. Combinations of these wt. % values to form various ranges are also possible, for example the hydrogel may comprise between about 30 wt. % to about 99 wt. % liquid swelling agent, for example between about 40 wt. % to about 99 wt. % liquid swelling agent.

In some embodiments, the hydrogel comprises between about 50 wt. % to about 99 wt. % liquid swelling agent. In some embodiments, the hydrogel comprises at least about 50, 55, 60, 65, 70, 75, 80, 85, 90, 95, or 99 wt. % liquid swelling agent. In other embodiments, the hydrogel comprises less than about 99, 95, 90, 85, 80, 75, 70, 65, 60, 55, or 55 wt. % liquid swelling agent. Combinations of these wt. % values to form various ranges are also possible, for example the hydrogel comprises between about 85 wt. % to about 98 wt. % liquid swelling agent. Suitable liquid swelling agents are described herein.

Alternatively, the hydrogel may be in a dry or dehydrated state where some of the absorbed liquid swelling agent is removed or evaporated. A dry hydrogel (also known as a dehydrated hydrogel) may comprise about 0.01% to about 20% liquid swelling agent, for example between about 0.5 wt. % to about 10 wt. % liquid swelling agent. The present inventors have found that the absorption and capture of $CO_2$ within the hydrogel can be controlled based on the degree of swelling with a liquid swelling agent. Surprisingly, in some embodiments, it was identified that dry or dehydrated polyamine hydrogels still managed to absorb $CO_2$ from the gaseous stream.

The hydrogel may have a surface area of between about 0.1 and 50 $m^2/g$, 1 and 25 $m^2/g$, or 2 and 10 $m^2/g$. The surface area (in $m^2/g$) may be at least about 0.1, 0.5, 1, 2, 3, 4, 5, 6, 7, 8, 9, 10, 15, 20, 25, 30, 35, 40, or 45. The surface area (in $m^2/g$) may be less than about 50, 45, 40, 35, 30, 25, 20, 15, 10, 9, 8, 7, 6, 5, 4, 3, 2, or 1. The surface area may be in a range provided by any two of these upper and/or lower values. The surface area may be provided for the hydrogel in a wet or dry state. It will be appreciated that the surface area will depend on particle size. The surface area can be measured using gas sorption with nitrogen or particle size analysis through microscopy.

The liquid swelling agent may be water, a non-aqueous solvent, or a combination thereof. The non-aqueous solvent may be a polar solvent. The liquid swelling agent may comprise one or more functional groups capable of binding to $CO_2$, for example an amine. Alternatively a group that can help to dissolve the $CO_2$, for example hydroxyl groups.

The liquid swelling agent has a boiling point. The boiling point may be at least about 100° C. For example, the liquid swelling agent may have a boiling point of at least about 100, 120, 140, 160, 200, 220, 240, 260, 280, or 300° C. The liquid swelling agent may have a boiling point of less than about 300, 280, 260, 240, 220, 200, 160, 140, 120, or 100° C. Combinations of these boiling points to provide various ranges are also possible, for example the liquid swelling agent has a boiling point of between about 100° C. to about 300° C. The boiling point of the liquid swelling agent can vary depending on the liquid swelling agent, for example water has a boiling point of about 100° C., glycerol has a boiling point of about 290° C., and monoethylene glycol (MEG) has a boiling point of about 198° C. According to at least some embodiments or examples described herein, high boiling point solvents may result in lower evaporation loss of the solvent when the hydrogel comprising the solved as a liquid swelling agent is subjected to regeneration (e.g. heating with steam) to remove captured $CO_2$, resulting in $CO_2$ being selectively removed before the solvent evaporates.

The liquid swelling agent may be capable of absorbing $CO_2$ by a chemical process, for example by binding to the $CO_2$ via one or more functional groups present in the liquid swelling agent. Suitable liquids that are capable of absorbing the acid gas by a chemical process include, but are not limited to, alkanolamines, alkylamines, alkyloxyamines, piperidine and its derivatives, piperazine and its derivatives, pyridine and its derivatives, and mixtures thereof, as described herein.

The liquid swelling agent may be selected from the group consisting of water, alcohols, polyol compounds, glycols, amines (e.g. alkanolamines, alkylamines, alkyloxyamines), piperidines, piperazines, pyridines, pyrrolidones, and derivatives or combinations thereof. Suitable alkanolamines may include monoethanolamine, diethanolamine, methyldiethanolamine, diisopropanolamine, N-ethylmonoethanolamine and aminoethoxyethanol. Suitable glycols may include ethylene glycol, monoethylene glycol, diethylene glycol, triethylene glycol, propylene glycol, propanediol, butylene glycol, Triethylene glycol, polyethylene glycol, and diglyme. Suitable alcohols may include 2-ethyoxyethanol, 2-methoxyethanol. Suitable polyol compounds may include glycerol. Suitable piperidines include piperidine, 2-methylpiperidine, 3-methylpiperidine, 4-methylpiperidine, 2-piperidineethanol (PE), 3-piperidinemthanol, and 4-piperidinemthanol. The liquid swelling agent may comprise any one or more of the above liquids.

In some embodiments, the liquid swelling agent may be selected from the group consisting of water, monoethanolamine, diethanolamine, methyldiethanolamine, diisopropanolamine, N-ethylmonoethanolamine, aminoethoxyethanol, ethylene glycol, Triethylene glycol, monoethylene glycol, diethylene glycol, triethylene glycol, propylene glycol, propanediol, butylene glycol, polyethylene glycol, glycerol, diglyme, 2-ethyoxyethanol, 2-methoxyethanol, glycerol, 2-methylpiperidine, 3-methylpiperidine, 4-methylpiperidine, 2-piperidineethanol (PE), 3-piperidinemthanol, and 4-piperidinemthanol.

Suitable liquids capable of absorbing $CO_2$ by a physical process (e.g. do not chemically bind to $CO_2$ but can dissolve it) include but are not limited to polyethylene glycol-dimethyl ethers (Selexol), N-methylpyrrolidone, propylene carbonate, methanol, sulfolane, imidazoles, ionic liquids, primary amines, secondary amines, tertiary amines, sterically hindered amines, and mixtures thereof.

In one embodiment, the liquid swelling agent is water, glycerol, monoethanolamine, diethanolamine, 2-piperidineethanol, ethylene glycol, Triethylene glycol, or monoethyleneglycol (MEG) or combinations thereof.

In some embodiments, the liquid swelling agent is capable of absorbing $CO_2$ when contacted with a low $CO_2$ concentration gaseous stream. Suitable liquid swelling agents that are capable of absorbing $CO_2$ include one or more of the liquid swelling agents described herein. In some embodiments, the liquid swelling agent may absorb $CO_2$ by a chemical or physical process. In some embodiments, the liquid swelling agent comprises functional groups capable of binding to $CO_2$. For example, the liquid swelling agent may comprise one or more amine groups, such as a primary amine ($—NH_2$) or secondary amine group (—NH—). Such amine groups are $CO_2$-phillic and readily react and bind with $CO_2$. In some embodiments, the liquid swelling agent comprises one or more amine groups amine, such as an alkanolamine. In another example, the liquid swelling agent comprises two or more (—OH) groups which are capable of physically dissolving $CO_2$, for example a glycol, a polyol or dimethyl ethers as described herein.

In some embodiments, the hydrogel may comprise at least about 0.5, 1, 5, 10, 20, 30, 40, 50, 60, 70, 80, 90, or 99 wt. % water. In some embodiments, the hydrogel may comprise less than about 99, 90, 80, 70, 60, 50, 40, 30, 20, 10, 5, 1, or 0.5 wt. % water. Combinations of these wt. % values to form various ranges are also possible, for example the hydrogel may comprise between about 40 wt. % to about 99 wt. % water. The water may have a degree of salinity, e.g. may be a brine or salt water.

In some embodiments, the hydrogel may comprise at least about 0.5, 1, 5, 10, 20, 30, 40, 50, 60, 70, 80, 90, or 99 wt. % glycerol. In some embodiments, the hydrogel may comprise less than about 99, 90, 80, 70, 60, 50, 40, 30, 20, 10, 5, 1, or 0.5 wt. % glycerol. Combinations of these wt. % values to form various ranges are also possible, for example the hydrogel may comprise between about 40 wt. % to about 99 wt. % glycerol.

In some embodiments, the hydrogel may comprise at least about 0.5, 1, 5, 10, 20, 30, 40, 50, 60, 70, 80, 90, or 99 wt. % monoethyleneglycol (MEG). In some embodiments, the hydrogel may comprise less than about 99, 90, 80, 70, 60, 50, 40, 30, 20, 10, 5, 1, or 0.5 wt. % monoethyleneglycol (MEG). Combinations of these wt. % values to form various ranges are also possible, for example the hydrogel may comprise between about 40 wt. % to about 99 wt. % monoethyleneglycol (MEG).

In some embodiments, the hydrogel may comprise at least about 0.5, 1, 5, 10, 20, 30, 40, 50, 60, 70, 80, 90, or 99 wt. % of an alkanolamine. In some embodiments, the hydrogel may comprise less than about 99, 90, 80, 70, 60, 50, 40, 30, 20, 10, 5, 1, or 0.5 wt. % of an alkanolamine. Combinations of these wt. % values to form various ranges are also possible, for example the hydrogel may comprise between about 40 wt. % to about 99 wt. % of an alkanolamine. Suitable alkanolamines are described herein.

In some embodiments, the hydrogel may comprise at least about 0.5, 1, 5, 10, 20, 30, 40, 50, 60, 70, 80, 90, or 99 wt. % of a glycol. In some embodiments, the hydrogel may comprise less than about 99, 90, 80, 70, 60, 50, 40, 30, 20, 10, 5, 1, or 0.5 wt. % of a glycol. Combinations of these wt. % values to form various ranges are also possible, for example the hydrogel may comprise between about 40 wt. % to about 99 wt. % of a glycol. Suitable glycols are described herein.

In some embodiments, the hydrogel may comprise at least about 0.5, 1, 5, 10, 20, 30, 40, 50, 60, 70, 80, 90, or 99 wt. % a piperidine. In some embodiments, the hydrogel may comprise less than about 99, 90, 80, 70, 60, 50, 40, 30, 20, 10, 5, 1, or 0.5 wt. % a piperidine. Combinations of these wt. % values to form various ranges are also possible, for example the hydrogel may comprise between about 40 wt. % to about 99 wt. % a piperidine. Suitable piperidines are described herein.

The absorptive capacity of the hydrogel may be enhanced by incorporating a hygroscopic salt into the hydrogel, either as part of the cross-linked hydrophilic polymer and/or as part of the liquid swelling agent, or as a separate aqueous solution that is absorbed into the hydrogel. The hygroscopic salt may be a monovalent salt such as lithium chloride, lithium bromide or sodium chloride, or a divalent salt such as calcium chloride, calcium sulphate. The hygroscopic salt may be present in the cross-linked polymer network in any amount up to saturation thereof.

Where a hydrogel comprises a non-aqueous solvent liquid swelling agent, the hydrogel may be prepared using the non-aqueous solvent as the dispersion medium (e.g. the hydrophilic polymer is dispersed in the non-aqueous liquid swelling agent, and cross-linked therein to form the hydrogel). Alternatively, the hydrogel may be prepared using water as the dispersion medium, and is subsequently dried/dehydrated to remove the absorbed water, and then the non-aqueous solvent is added to the hydrogel and absorbed therein. For example, the dried hydrogel may be immersed in the non-aqueous solvent, and left for a period of time to infuse/absorb the non-aqueous solvent. Alternatively, the hydrogel may be a commercially available hydrogel (e.g. Bio-Gel® P polyacrylamide beads) which are subsequently added to the liquid swelling agent to be absorbed therein.

The hydrogel may be characterised by an elastic modulus. For example, the hydrogel may have an elastic modulus of between about 0.1 Pa to about 12,000 Pa. In some embodiments, the elastic modulus of the hydrogel may be at least about 0.1, 10, 30, 50, 100, 200, 500, 1,000, 2,000, 5,000, 8,000, 10,000 or 12,000 Pa. In some embodiments, the elastic modulus of the hydrogel may be less than about 12,000, 10,000, 8,000, 5,000, 2,000, 1,000, 500, 200, 100, 50, 30, 10, or 0.1 Pa. Combinations of these elastic modulus values to form various ranges are also possible, for example the elastic modulus of the hydrogel may be between about 100 Pa to about 5,000 Pa. The hydrogel may have an elastic modulus of between about 2,000 to about 5,000. In other embodiments, the elastic modulus of the hydrogel may be at least about 0.1, 10, 30, 50 or 100 Pa. In various embodiments, the elastic modulus of the hydrogel may be less than about 12,000, 10,000, 8000, or 6000 Pa. In some embodiments, the elastic modulus of the hydrogel may be between about 0.2 Pa to about 12000 Pa, about 0.2 Pa to about 10000 Pa, about 0.2 Pa to about 5000 Pa, about 1 Pa to about 12000 Pa, or about 1 Pa to about 10,000 Pa. In some embodiments, the elastic modulus of the hydrogel may be between about 10 Pa to about 12000 Pa, about 10 Pa to about 10,000 Pa, or about 100 Pa to about 10,000 Pa. In other embodiments, the elastic modulus of the hydrogel may be from between about 0.1 Pa to about 10,000 Pa, about 0.1 Pa to about 5000 Pa, about 0.1 Pa to about 1000 Pa, about 1 Pa to about 12,000 Pa, about 1 Pa to about 10,000 Pa, about 100 Pa to about 12,000 Pa, about 500 Pa to about 12000 Pa, or about 1000 Pa to about 12,000 Pa. In other embodiments, the elastic modulus of hydrogel may be between about 1 Pa to about 5000 Pa, about 10 Pa to about 5000 Pa, or about 100 Pa to about 5000 Pa. In some embodiments, the elastic modulus of the hydrogel is less than about 9,000, 5,000, or 4000 Pa.

The elastic modulus may be determined by a number of suitable techniques, including using a rheometer, for example a HR-3 Discovery Hybrid Rheometer (TA Instruments). A Rheometer can be used to control shear stress or shear strain and/or apply extensional stress or extensional strain and thereby determine mechanical properties of a hydrogel including the modulus of elasticity thereof.

The hydrogel may be provided in a wide range of morphologies. Illustrative examples of suitable morphologies may include particles, beads, sheets/layers, cast blocks, cylinders, discs, porous membranes and monoliths. For example, the hydrogel may be provided as a film/coating layer, for example a gel layer where the gaseous stream is flowed thereon or through the layer. Such layers may be a provided as a rolled sheet. Alternatively, the hydrogel layer may also be provided as a monolith comprising a plurality of porous channels, wherein the gaseous stream flows through. Other layer or coating morphologies and geometries are also applicable.

In one embodiment, the hydrogel may comprise a plurality of particles. The term "particle" (also referred to as "particulate") refers to the form of discrete solid units. The units may take the form of flakes, fibres, agglomerates, granules, powders, spheres, pulverized materials or the like, as well as combinations thereof. The particles may have any desired shape including, but not limited to, cubic, rod like, polyhedral, spherical or semi-spherical, rounded or semi-rounded, angular, irregular, and so forth. The particle morphology can be determined by any suitable means such as optical microscopy. In one embodiment, the hydrogel may comprise a plurality of spherical or substantially spherical beads.

The hydrogel particles may be of any suitable size and/or shape and/or morphology. In one embodiment, the hydrogel particles may have an average particle size. For spherical hydrogel particles, the particle size is the diameter of the particles. For non-spherical hydrogel particles, the particle size is the longest cross-section dimension of the particles. In some embodiments, the hydrogel particles may have an average particle size in a range from about 10 μm to about 2000 μm, for example from about 10 μm to about 1000 μm. The hydrogel particles may have an average particle size of at least about 10, 20, 50, 100, 200, 300, 400, 500, 700, 1000, 1500, or 2000 μm. In other embodiments, the hydrogel particles may have an average particle size of less than about 2000, 1500, 1000, 700, 500, 400, 300, 200, 100, 50, 20, or 10 μm. Combinations of these particle size values to form various ranges are also possible, for example the hydrogel particles may have an average particle size of between about 10 μm to about 500 μm, about 100 μm to about 400 μm, for example about 200 μm to about 300 μm. The average particle size can be determined by any means known to the skilled person, such as electron microscopy, dynamic light scattering, optical microscopy or size exclusion methods (such as graduated sieves). The hydrogel particles may have a controlled average particle size and can maintain their morphology in a range of different environments and shear conditions, for example while in contact with a gaseous stream and/or moist or dry environments.

In one embodiment, the hydrogel may be self-supporting. The term 'self-supporting' as used herein refers to the ability of the hydrogel to maintain its morphology in the absence of a support material (e.g. scaffold). For example, the hydrogel may comprise a plurality of particles, wherein the particles maintain their morphology in the absence of a scaffold support. The self-supported nature of the hydrogel may provide certain advantages, for example allows particles of hydrogel to be contacted with the gaseous stream using a fluidized bed reactor. Accordingly, in one embodiment, the hydrogel does not comprise a separate support structure, such as a separate porous support structure. This does not preclude from the hydrogel itself being porous in nature. Thus it will be understood that, where the hydrogel is "self-supporting", there is no support material (e.g. scaffold) exogenous to the hydrogel.

In some embodiments, the hydrogel may be provided as layer within a column, wherein the gaseous stream is flowed through the column and passes through the hydrogel layer. The layer is not limited to any particular hydrogel morphology. In one example, a suitable column may be packed with a plurality of hydrogel particles to form a packed-bed with sufficient interstitial space between adjacent particles to allow a flow of gas therethrough. Alternatively, the hydrogel may be provided in flow with the gaseous stream (e.g. a fluidised bed reactor).

As described herein, the hydrogel may be prepared according to any suitable method known to the person skilled in the art for preparing hydrogels. For example, the hydrogel may be prepared by adding to a solution comprising a hydrophilic polymer a solution comprising a suitable cross-linking agent to initiate the formation of the hydrogel. Alternatively the hydrogel may be prepared by polymerising a monomer (Eg., acrylamide) with a suitable cross-linker (eg., methylenebisacrylamide) using a free-radical process. The solution may be an aqueous solution (e.g. water) or may comprise one or more liquid swelling agents as described herein. Alternatively, the hydrogel may be a commercially available hydrogel (e.g. Bio-Gel® P polyacrylamide beads) which optionally may be added to the liquid swelling agent to be absorbed therein. The concentration of the hydrophilic polymer and/or cross-linking agent can vary (see for example Table 1, Example 3). The hydrogel may be subsequently ground/pulverised into a plurality of particles.

Hydrophilic Polymer

The hydrophilic polymer may also be selected to provide suitable mechanical and chemical properties to the hydrogel. For example, in some embodiments, the hydrogel may need to be able to withstand various shear and stress environments, such as when in contact with the gaseous stream and/or dry or moist/humid environments. In some embodiments, the hydrogel may also need to withstand a wide temperature range, for example when undergoing thermal regeneration. In some embodiments, the hydrogel may also need to be physically robust so that it can be introduced into various gas flowlines as a flow of particulate material or so that the particulate material can be provided in a packed bed with sufficient interstitial space between adjacent particles to allow a flow of gas (e.g. ambient air) therethrough. In some embodiments, the cross-linked hydrophilic polymer is also chemically inert. Accordingly, one or more of these properties may be provided by the appropriate selection of the hydrophilic polymer.

In some embodiments, the hydrogel comprises between about 0.05 wt. % to about 50 wt. % hydrophilic polymer. In some embodiments, the hydrogel comprises at least about 0.01, 0.05, 0.1, 0.2, 0.5, 1, 2, 5, 10, 15, 20, 25, 30, 35, 40, 45, or 50 wt. % hydrophilic polymer. In other embodiments, the hydrogel comprises less than about 50, 45, 40, 35, 30, 25, 20, 15, 10, 5, 2, 1, 0.5, 0.2, 0.1, 0.05 or 0.01 wt. % hydrophilic polymer. Combinations of these hydrophilic polymer concentrations to form various ranges are also possible, for example the hydrogel comprises between about 0.01 wt. % to about 50 wt. %, about 0.05 wt. % to about 50 wt. %, about 0.05 wt. % to about 25 wt. %, about 10 wt. % to about 50 wt. %, or about 30 wt. % to about 50 wt. % hydrophilic polymer.

In one embodiment, the hydrogel may be a dry or dehydrated hydrogel. In this embodiment, the dry or dehydrated hydrogel may comprise between about 80 wt. % to about 99.9 wt. % hydrophilic polymer.

In some embodiments, the hydrophilic polymer has a weight average molecular weight (Mw) in the range of between about 100 g/mol to about 500,000 g/mol, for example between about 1,000 g/mol to about 2,500,000 g/mol. In some embodiments, the hydrophilic polymer has a weight average molecular weight (Mw) of at least about 1,000, 5,000, 10,000, 50,000, 100,000, 150,000, 200,000, 250,000 or 500,000 g/mol. In other embodiments, the hydrophilic polymer has a weight average molecular weight (Mw) of less than about 500,000, 250,000, 200,000, 150,000, 100,000, 50,000, 10,000, 5,000 or 1,000 g/mol. Combinations of these molecular weights to form various ranges are also possible, for example the hydrophilic polymer has a weight average molecular weight (Mw) of between about 1,000 to about 250,000 g/mol, about 5,000 to about 50,000 g/mol, or 10,000 to about 30,000 g/mol. In some embodiments, the hydrophilic polymer has a weight average molecular weight (Mw) of about 25,000 g/mol. It will be appreciated that these weight average molecular weights are provided for the hydrophilic polymer prior to cross-linking. It will be appreciated that the weight average molecular weight of the hydrophilic polymer may vary depending on the type used to prepare the hydrogel. In one embodiment, the hydrophilic polymer may comprise a homopolymer or a copolymer. The weight average molecular weight can be determined using a variety of suitable techniques known to the person skilled in the art, for example gel permeation chromatography (GPC), size-exclusion chromatography (SEC) and light scattering. In one embodiment, the weight average molecular weight is determined size-exclusion chromatography (SEC).

In one embodiment, the Mw is determined using size exclusion chromatography (SEC) by passing a solution of the hydrophilic polymer through a suitable column comprising a gel that separates the hydrophilic polymer based on molecular size (i.e. hydrodynamic volumes which can be correlated with molecular weight), with larger size molecules (larger Mw) eluting first followed by smaller size molecules (smaller Mw). This can be performed in a suitable organic solvent or in aqueous media. The Mw is typically determined against a series of known polymer standards or using molar mass sensitive detectors. Suitable protocols for determining molecular weight of the hydrophilic polymer are outlined in "Size-exclusion Chromatography of Polymers" *Encyclopaedia of Analytical Chemistry,* 2000, pp 8008-8034, incorporated herein by reference.

In some embodiments, the hydrogel comprises a cross-linked polyamine or a cross-linked polyacrylamide, derivative or copolymer thereof. In one embodiment, the hydrogel comprises a cross-linked polyacrylamide or a cross-linked polyalkylenimine, derivative or copolymer thereof. In some embodiments, the hydrogel comprises a cross-linked hydrophilic polymer selected from the group consisting of poly (methacrylamide), poly(dimethylacrylamide), poly(ethylacrylamide), poly(diethylacrylamide), poly (isopropylacrylamide), poly(methylmethacrylamide), poly (ethylmethacrylamide, polyacrylamide, poly(acrylamide-co-acrylic acid), poly(acrylamide-co-sodium acrylate), poly (acrylamide-co-potassium acrylate), poly(acrylamide-co-acrylic acid) partial potassium salt, poly(acrylamide-co-acrylic acid) partial sodium salt and poly(acrylamide-co-methylenebisacrylamide), polyethylenimine, polypropylenimine, and polyallylamine, or a derivative or copolymer thereof.

In some embodiments, the hydrogel comprises a cross-linked hydrophilic polymer selected from the group consisting of polyacrylic acid, polyacrylamide or polyacrylamide-co-acrylic acid, polyacrylamide-co-acrylic acid partial sodium salt, polyacrylamide-co-acrylic acid partial potassium salt, poly(acrylic acid-co-maleic acid), poly(N-isopropylacrylamide, polyethylene glycol, polyethyleneimine, polyallylamine and vinylpyrrolidone, or a derivative or copolymer thereof. Alternatively, the hydrogel may comprise cross-linked natural hydrophilic polymers, for example polysaccharides, chitin, polypeptide, alginate or cellulose.

Other suitable cross-linked hydrophilic polymers are described herein, for example polyamines or polyacrylamides, derivatives or copolymers thereof.

The $CO_2$ may be removed from the gaseous stream by being absorbed into a hydrogel. For example, the $CO_2$ may be absorbed into the hydrogel by a chemical or physical process. In some embodiments, the cross-linked hydrophilic polymer comprise functional groups capable of binding and $CO_2$. For example, owing to its porous nature, on contact with the hydrogel, the low $CO_2$ concentration gas can pass through the interstitial pores within the hydrogel and react and bind to the functional groups on the hydrophilic polymer. In some embodiments, the hydrophilic polymer may comprise one or more functional groups capable of binding to $CO_2$. For example, the hydrophilic polymer may comprise one or more amine groups, such as a primary amine ($—NH_2$) or secondary amine group (—NH—). Such amine groups are $CO_2$-phillic and readily react and bind with $CO_2$. Thus in some embodiments, the hydrophilic polymer is a polyamine.

Polyamines

In one embodiment, the hydrophilic polymer may comprise a polyamine, derivative or a copolymer thereof. As understood in the art, a polyamine is an organic compound having two or more amine groups (e.g. primary $—NH_2$, secondary —NHR, and/or tertiary $—NR_2$ amine groups).

In some embodiments, the hydrophilic polymer may comprise a liner, branched, or dendritic polyamine, derivative or copolymer thereof. A linear polyamine is defined as containing only primary amines, secondary amines, or both primary amines and secondary amines. By way of illustrative example only, the structure of one possible linear polyamine before crosslinking is provided below as Formula 1

Formula 1

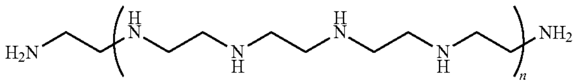

where n can be 1 to 10,000. In other examples, n may be at least 1, 10, 100, 200, 500, or 1000. In other examples, n may be less than 10,000, 9,000, 8,000, 7,000, 6,000, 5,000, 4,000, 3,000, 2,000, 1,000, 500, 200, or 100. In other examples, n may be a range provided by any two of these upper and/or lower values, for example 1 to 1000, 10 to 5,000, or 100 to 2000.

The ratio of secondary to primary amines in the linear polyamine of Formula 1 may be about 0.1 to 100. The ratio of secondary to primary amines in the linear polyamine of Formula 1 may be at least about 0.1, 0.5, 1, 2, 3, 4, 5, 6, 7, 8, 9, 10, 15, 20, 25, 30, 35, 40, 45, 50, 55, 60, 65, 70, 75, 80, 85, 90 or 95. The ratio of secondary to primary amines in the linear polyamine of Formula 1 may be less than about 100, 95, 90, 85, 80, 75, 70, 65, 60, 55, 50, 45, 40, 35, 30, 25, 20, 15, 10, 9, 8, 7, 6, 5, 4, 3, 2, 1, or 0.5. The ratio may be a range provided by any two of these upper and/or lower values.

A branched polyamine is defined as containing any number of primary ($—NH_2$), secondary (—NH—) and tertiary amines

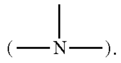

By way of illustrative example only, the structure of one possible branched polyamine before crosslinking is provided below as Formula 2 as follows:

Formula 2

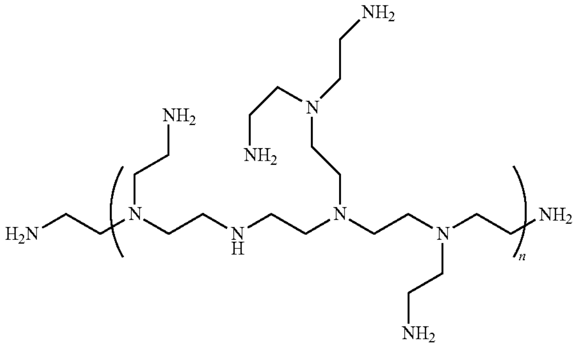

wherein n can be 1 to 10,000. In other examples, n may be at least 1, 10, 100, 200, 500, or 1000. In other examples, n may be less than 10,000, 9,000, 8,000, 7,000, 6,000, 5,000, 4,000, 3,000, 2,000, 1,000, 500, 200, or 100. In other examples, n may be a range provided by any two of these upper and/or lower values, for example 1 to 1000, 10 to 5,000, or 100 to 2000.

The ratio of primary to secondary to tertiary amine groups in the branched polyamine can be about 10:80:10 to 60:10:

30, about 60:30:10 to 30:50:20, or about 45:45:10 to 35:45:20. The person skilled in the art would understand that the structures of branched polyamines can vary greatly depending on the number of tertiary amine groups present.

A dendritic polyamine is defined as containing only primary (—$NH_2$) and tertiary amines

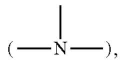

symmetric in at least one plane through the centre (core) of the polyamine, where each polymer branch is terminated by a primary amine, and where each branching point is a tertiary amine. The ratio of primary amine groups to tertiary amine groups in a dendritic polyamine may be about 1 to 3. By way of illustrative example only, the structure of one possible dendritic polyamine before crosslinking is provided below as Formula 3 as follows:

Formula 3

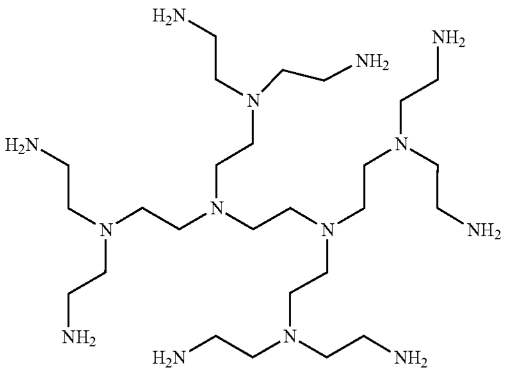

The hydrophilic polymer may comprise a hyperbranched polyamine, derivative or copolymer thereof. A hyperbranched polyamine is defined as having a structure resembling dendritic polyamine, but containing defects in the form of secondary amines (—NH—) (e.g. linear subsections as would exist in a branched polyamine), in such a way that provides a random structure instead of a symmetric dendritic structure. In a hyperbranched structure, the ratio of primary to secondary to tertiary amine amines may be about 65:5:30 to 30:10:60.

In one embodiment, the polyamine, derivative or copolymer thereof may comprise between about 10 mol % to 70 mol % primary amine (—$NH_2$) groups, for example at least about 10, 20, 30, 40, 50 mol % primary amine groups. The polyamine, derivative or copolymer thereof may comprise between about 10 mol % to 70 mol % secondary amine (—NH—) groups, for example at least about 10, 20, 30, 40, 50 mol % secondary amine groups. The polyamine, derivative or copolymer thereof may comprise between about 1 mol % to about 10 mol % tertiary amine (—N—) groups, for example at least about 1, 2, 5 mol % tertiary amine groups. The ratio of primary to secondary to tertiary amine groups in the polyamine, derivative or copolymer thereof may be about 10:80:10 to 60:10:30, about 60:30:10 to 30:50:20, or about 45:45:10 to 35:45:20. In one embodiment, the polyamine may comprise at least one or more aliphatic amine groups (e.g. an amine wherein no aromatic ring groups are directly bound to the nitrogen atom of the amine).

In one embodiment, the hydrophilic polymer comprises a branched polyamine, derivative or copolymer thereof. The polyamine, derivative or copolymer thereof can be cross-linked by one or more cross-linking agents described herein.

In one embodiment, the polyamine, derivative or copolymer thereof is a polyalkylenimine. The polyalkylenimine may be selected from the group consisting of polyethylenimine, polypropylenimine, and polyallylamine, derivatives or copolymers thereof. Suitable polyamines that can be used to form the hydrogel may include polyethylenimine, polypropylenimine, and polyallylamine. In one embodiment, the hydrophilic polymer comprises polyethylenimine or a copolymer thereof. By using a hydrogel comprising a cross-linked polyamine (such as polyethylenimine), the hydrogel comprises a plurality of primary and secondary amine functional groups which are capable of reacting and binding to $CO_2$ upon contact with a low $CO_2$ concentration gaseous stream.

In some embodiments, the cross-linked polyamine is swollen with one or more liquid swelling agents as described herein, for example alcohols, polyol compounds, glycols, amines (e.g. alkanolamines, alkylamines, alkyloxyamines), piperidines, piperazines, pyridines, pyrrolidones, and derivatives or combinations thereof. Suitable alkanolamines may include monoethanolamine, diethanolamine, methyldiethanolamine, diisopropanolamine, N-ethylmonoethanolamine and aminoethoxyethanol. Suitable glycols may include ethylene glycol, Triethylene glycol, monoethylene glycol, diethylene glycol, propylene glycol, propanediol, butylene glycol, polyethylene glycol, and diglyme. Suitable alcohols may include 2-ethyoxyethanol, 2-methoxyethanol. Suitable polyol compounds may include glycerol. Suitable piperidines include piperidine, 2-methylpiperidine, 3-methylpiperidine, 4-methylpiperidine, 2-piperidineethanol (PE), 3-piperidinemthanol, and 4-piperidinemethanol. The liquid swelling agent may comprise any one or more of the above liquids.

In some embodiments, the hydrogel comprises a cross-linked polyalkylenimine selected from the group consisting of polyethylenimine, polypropylenimine, and polyallylamine, or copolymer thereof, and is swollen with a liquid swelling agent selected from the group consisting of water, monoethanolamine, diethanolamine, methyldiethanolamine, diisopropanolamine, N-ethylmonoethanolamine, aminoethoxyethanol, ethylene glycol, monoethylene glycol, diethylene glycol, triethylene glycol, propylene glycol, propanediol, butylene glycol, polyethylene glycol, glycerol, diglyme, 2-ethyoxyethanol, 2-methoxyethanol, glycerol, 2-methylpiperidine, 3-methylpiperidine, 4-methylpiperidine, 2-piperidineethanol (PE), 3-piperidinemthanol, and 4-piperidinemthanol, or a mixture thereof.

Polyacrylamides

In some embodiments or examples, the hydrophilic polymer may comprise a polyacrylamide, derivative or copolymer thereof. As understood in the art, a polyacrylamide, derivative or copolymer is an organic compound having two or more acrylamide units. In some embodiments or examples, the polyacrylamide, derivative or copolymer thereof, may comprise copolymerisable hydrophilic monomers comprising at least two acrylamide or acrylamide derivatives to form a polyacrylamide, derivative or copolymer thereof. In another embodiment or example, the polyacrylamide copolymer, may comprise copolymerisable hydrophilic monomers comprising at least one acrylamide or acrylamide derivative and at least one carboxylic acid derivative to form a polyacrylamide copolymer.

The acrylamide derivative may be selected from N-alkyl or N,N-dialkyl substituted acrylamide or methacrylamide. In some embodiments or examples, the polyacrylamide derivative may be selected from the group comprising N-acrylamide, methylacrylamide, N-ethylacrylamide, N-isopropylacrylamide (NiPAAm), N-octylacrylamide, N-cyclohexylacrylamide, N-methyl-N-ethylacrylamide, N-methylmethacrylamide, N-ethylmethacrylamide, N-isopropylmethacrylamide, N, N-dimethylacrylamide, N,N-diethylacrylamide, N,N-dimethylmethacrylamide, N, N-diethylmethacrylamide, N,N-dicyclohexylacrylamide, N-methyl-N-cyclohexylacrylamide, or combinations thereof. In an embodiment or example, the arylamide derivative may be selected from methacrylamide, dimethylacrylamide, N-isopropylacrylamide. N,N'-methylene-bis-acrylamide, or combinations thereof.

The carboxylic acid derivative may be selected from the group comprising acrylic acid, methacrylic acid, methyl methacrylate, sodium acrylate, potassium acrylate, sodium methacrylate, potassium methacrylate, 2-hydroxyethyl methacrylate (HEMA), or combinations thereof.

In one embodiment or example, the acrylamide or acrylamide derivatives used in the preparation of the polyacrylamide or polyacrylamide derivative may be the same. In another embodiment or example, the acrylamide or acrylamide derivative used in the preparation of the polyacrylamide copolymer may be different. In yet another embodiment, at least one acrylamide or acrylamide derivative and at least one carboxylic acid derivative may be used in the preparation of the polyacrylamide copolymer.

In some embodiments or examples, the polyacrylamide, derivative, or copolymer thereof may be selected from the group comprising or consisting of polyacrylamide, poly(methacrylamide), poly(dimethylacrylamide), poly(ethylacrylamide), poly(diethylacrylamide), poly(isopropylacrylamide), poly(methylmethacrylamide), poly(ethylmethacrylamide, poly(acrylamide-co-acrylic acid), poly(acrylamide-co-sodium acrylate), poly(acrylamide-co-potassium acrylate), poly(acrylamide-co-acrylic acid) partial potassium salt, poly(acrylamide-co-acrylic acid) partial sodium salt and poly(acrylamide-co-methylenebisacrylamide).

In some embodiments or examples, the polyacrylamide, derivative or copolymer thereof may be selected from the group comprising or consisting of polyacrylamide, poly(methacrylamide), poly(dimethylacrylamide), poly(isopropylacrylamide), poly(acrylamide-co-acrylic acid), poly(acrylic acid-co-maleic acid), poly(acrylamide-co-sodium acrylate), poly(acrylamide-co-potassium acrylate), poly(acrylamide-co-acrylic acid) partial potassium salt, poly(acrylamide-co-acrylic acid) partial sodium salt and poly(acrylamide-co-methylenebisacrylamide). In some embodiments or examples, the polyacrylamide copolymer may be selected from the group comprising or consisting of poly(acrylamide-co-acrylic acid), poly(acrylamide-co-sodium acrylate), poly(acrylamide-co-potassium acrylate), poly(acrylamide-co-acrylic acid) partial potassium salt, poly(acrylamide-co-acrylic acid) partial sodium salt and poly(acrylamide-co-methylenebisacrylamide).

In some embodiments, the polyacrylamide, derivative, or copolymer thereof is a poly(acrylamide-co-acrylic acid) provided below as Formula 4 as follows:

Formula 4

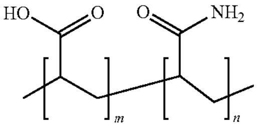

wherein:

each R is independently selected from the group consisting of hydrogen, sodium, or potassium; and m and n are provided in a ratio in the polymer, wherein the ratio of m to n is between about 10:1 to 1:10, about 8:1 to 1:8, about 6:1 to 1:6, about 4:1 to 1:4, or about 2:1 to about 1:2. In some embodiments the ratio of m to n is between about 1:2 to 4:1, for example about 4:1.

In some embodiments, the polyacrylamide, derivative, or copolymer thereof is poly(acrylamide-co-acrylic acid), poly(acrylamide-co-sodium acrylate), poly(acrylamide-co-potassium acrylate), poly(acrylamide-co-acrylic acid) partial potassium salt, poly(acrylamide-co-acrylic acid) partial sodium salt, and poly(acrylamide-co-methylenebisacrylamide). In one embodiment, the polyacrylamide, derivative, or copolymer thereof is poly(acrylamide-co-acrylic acid), The polyacrylamide, derivative, or copolymer thereof can be cross-linked by one or more cross-linking agents as described herein, For example, the polyacrylamide may be cross-linked with N, N-methylenebisacrylamide or ethyleneglycol dimethacrylate via a free-radical initiated vinyl polymerization mechanism. In one embodiment, the cross-linked hydrophilic polymer is poly(acrylamide-co-methylenebisacrylamide) or poly(acrylamide-co-ethyleneglycol dimethacrylate). The polyacrylamide, derivative, or copolymer thereof may also be cross-linked with an aldehyde, for example formaldehyde or glutaraldehyde.

In some embodiments, the hydrogel comprising cross-linked polyacrylamide, derivative, or copolymer thereof, may further comprise one or more metal salts. Suitable metal salts include sodium salts or potassium salts.

In some embodiments, the hydrogel comprises a cross-linked polyacrylamide, derivative, or copolymer thereof, swollen with a liquid swelling agent which is capable of reacting, binding or dissolving the $CO_2$ upon contact with a low $CO_2$ concentration gaseous stream. For example, the cross-linked polyacrylamide hydrogel may be swollen with one or more liquid swelling agents as described herein, for example alcohols, polyol compounds, glycols, amines (e.g. alkanolamines, alkylamines, alkyloxyamines), piperidines, piperazines, pyridines, pyrrolidones, and derivatives or combinations thereof. Suitable alkanolamines may include monoethanolamine, diethanolamine, methyldiethanolamine, diisopropanolamine, N-ethylmonoethanolamine and aminoethoxyethanol. Suitable glycols may include ethylene glycol, monoethylene glycol, diethylene glycol, triethylene glycol, propylene glycol, propanediol, butylene glycol, polyethylene glycol, and diglyme. Suitable alcohols may include 2-ethyoxyethanol, 2-methoxyethanol. Suitable polyol compounds may include glycerol. Suitable piperidines include piperidine, 2-methylpiperidine, 3-methylpiperidine, 4-methylpiperidine, 2-piperidineethanol (PE), 3-piperidinemthanol, and 4-piperidinemthanol. The liquid swelling agent may comprise any one or more of the above liquids.

In some embodiments, the hydrogel comprises a cross-linked polyacrylamide, derivative, or copolymer thereof, swollen with a liquid swelling agent selected from the group consisting of water, monoethanolamine, diethanolamine, methyldiethanolamine, diisopropanolamine, N-ethylmonoethanolamine, aminoethoxyethanol, ethylene glycol, monoethylene glycol, diethylene glycol, triethylene glycol, propylene glycol, propanediol, butylene glycol, polyethylene glycol, glycerol, diglyme, 2-ethyoxyethanol, 2-methoxyethanol, glycerol, 2-methylpiperidine, 3-methylpiperidine, 4-methylpiperidine, 2-piperidineethanol (PE), 3-piperidinemthanol, and 4-piperidinemthanol and combinations thereof. In one embodiment, the liquid swelling agent is water, glycerol, monoethanolamine, diethanolamine, 2-piperidineethanol, ethylene glycol, triethylene glycol, or monoethyleneglycol (MEG) or combinations thereof.

In one embodiment, the hydrogel comprising a cross-linked polyacrylamide, derivative, or copolymer thereof is swollen with an alkanolamine, for example one or more of monoethanolamine, diethanolamine, methyldiethanolamine, diisopropanolamine, N-ethylmonoethanolamine and aminoethoxyethanol. In one embodiment, the hydrogel comprising a cross-linked polyacrylamide, derivative, or copolymer thereof is swollen with a piperidine, for example piperidine, 2-methylpiperidine, 3-methylpiperidine, 4-methylpiperidine, 2-piperidineethanol (PE), 3-piperidinemthanol, and 4-piperidinemthanol. In one embodiment, the hydrogel comprising a cross-linked polyacrylamide, derivative, or copolymer thereof is swollen with a glycol, for example ethylene glycol, monoethylene glycol, diethylene glycol, triethylene glycol, propylene glycol, propanediol, butylene glycol, polyethylene glycol, and diglyme. In one embodiment, the hydrogel comprising a cross-linked polyacrylamide, derivative, or copolymer thereof is swollen with a mixture comprising an alkanolamine and a glycol, for example diethanolamine and ethylene glycol, or a piperidine and a glycol, for example 2-piperidineethanol and ethylene glycol.

In one embodiment, the hydrogel comprising a cross-linked polyacrylamide, derivative, or copolymer thereof is swollen with a mixture comprising an alkanolamine and water, for example diethanolamine and water, or a piperidine and water, for example 2-piperidineethanol and water.

In one embodiment, the hydrogel comprises a cross-linked polyacrylamide, derivative or copolymer thereof and is selected from the group consisting of poly(acrylamide-co-acrylic acid), poly(acrylamide-co-sodium acrylate), poly (acrylamide-co-potassium acrylate), poly(acrylamide-co-acrylic acid) partial potassium salt, poly(acrylamide-co-acrylic acid) partial sodium salt, and poly(acrylamide-co-methylenebisacrylamide), and is swollen with a liquid swelling agent selected from the group consisting of water, monoethanolamine, diethanolamine, methyldiethanolamine, diisopropanolamine, N-ethylmonoethanolamine, aminoethoxyethanol, ethylene glycol, monoethylene glycol, diethylene glycol, triethylene glycol, propylene glycol, propanediol, butylene glycol, polyethylene glycol, glycerol, diglyme, 2-ethyoxyethanol, 2-methoxyethanol, glycerol, 2-methylpiperidine, 3-methylpiperidine, 4-methylpiperidine, 2-piperidineethanol (PE), 3-piperidinemthanol, and 4-piperidinemthanol, or a mixture thereof.

Cross-Linker and Cross-Linking Agent

The hydrogel comprises a cross-linked hydrophilic polymer. It will be understood that some degree of cross-linking of the hydrophilic polymer is required to form the hydrogel. The rigidity and elasticity of the hydrogel can be tailored by altering the degree of cross-linking. The cross-linker promotes the formation of the 3D polymeric network, making it insoluble. The insolubilized cross-linked polymeric network allows for the adoption and retention of water and other liquids. An overview of cross-linked hydrogels is discussed in Maitra et al., *American Journal of Polymer Science,* 2014, 4 (2), 25-31, which is incorporated herein by reference.

As used herein, the term "cross-link, "cross-linked" or "cross-linking" refers to the formation of interactions within or between hydrogel-forming polymers which result in the formation of a three-dimensional matrix. i.e. a hydrogel. For example, a polyamine may be cross-linked by 1,3-butadiene diepoxide (BDDE) or triglycidyl trimethylolpropane ether (TTE or TMPTGE) to form a cross-linked polyamine hydrogel.

In some embodiments, the hydrophilic polymer comprises about 0.01 mol % to about 50 mol % cross-linking agent. The hydrophilic polymer may comprise at least about 0.01, 0.1, 1, 2, 5, 10, 15, 20, 25, 30, 35, 40, 45, or 50 mol % cross-linking agent. The hydrophilic polymer may comprise less than about 50, 45, 40, 35, 30, 25, 20, 15, 10, 5, 2, 1, 0.1 or 0.01 mol % cross-linking agent. Combinations of these mol % values to form various ranges are also possible, for example the hydrophilic polymer may comprise between about 0.01 mol % to about 50 mol %, about 0.01 mol % to about 20 mol %, or about 0.01 mol % to about 10 mol % cross-linking agent.

In some embodiments, the hydrogel comprises between about 1 wt. % to about 20 wt. % cross-linking agent. In some embodiments, the hydrogel comprises at least about 1, 2, 3, 4, 5, 6, 8, 10, 15 or 20 wt. % cross-linking agent. In other embodiments, the hydrogel comprises less than about 20, 15, 20, 15, 10, 8, 6, 5, 3, 2, or 1 wt. % cross-linking agent. Combinations of these wt. % values to form various ranges are also possible, for example the hydrogel in a non-swollen state comprises between about 1 wt. % to about 6 wt. % cross-linking agent.

Accordingly, in some embodiments, the hydrogel comprises between about 0.05 wt. % to about 50 wt. % cross-linked hydrophilic polymer. In some embodiments, the hydrogel comprises at least about 0.01, 0.05, 0.1, 0.2, 0.5, 1, 2, 5, 10, 15, 20, 25, 30, 35, 40, 45, or 50 wt. % cross-linked hydrophilic polymer. In other embodiments, the hydrogel comprises less than about 50, 45, 40, 35, 30, 25, 20, 15, 10, 5, 2, 1, 0.5, 0.2, 0.1, 0.05 or 0.01 wt. % cross-linked hydrophilic polymer. Combinations of these cross-linked hydrophilic polymer to form various ranges are also possible, for example the hydrogel comprises between about 0.01 wt. % to about 50 wt. %, about 0.05 wt. % to about 50 wt. %, about 0.05 wt. % to about 25 wt. %, about 10 wt. % to about 50 wt. %, or about 30 wt. % to about 50 wt. % cross-linked hydrophilic polymer.

The swelling ability of the hydrogel is dependent on the nature of the cross-linked hydrophilic polymer and the solvent that is swelling the hydrogel. For example, a hydrogel with long hydrophilic cross-links may swell more than an analogous cross-linked polymer network with shorter hydrophobic cross-links.

The cross-linking agent may be selected to provide an alkyl cross-linker, heteroalkyl cross-linker, cycloalkyl cross-linker, arylalkyl cross-linker, or heteroarylalkyl cross-linker, in the cross-linked hydrophilic polymer, each of which may be optionally substituted and/or optionally interrupted as described herein. The cross-linking agent may comprise between about 1 and 30 carbon atoms and may be optionally substituted and/or optionally interrupted as described herein.

In some embodiments, the cross-linking agent is selected to provide an alkyl cross-linker in the cross-linked hydrophilic polymer. The alkyl cross-linker may be optionally substituted with one or more functional groups selected from alkyl, halo, hydroxyl, or amine, and optionally interrupted with one or more O, N, Si or S. In one example, the cross-linker is substituted with one or more hydroxyl groups. The presence of one or more hydroxyl groups on the cross-linker can further improve the binding and absorption of $CO_2$ in the hydrogel, at least according to some examples as described herein.

In some embodiments, the cross-linking agent may be selected to provide a $C_1$-$C_{20}$alkyl cross-linker in the cross-linked hydrophilic polymer. It will be appreciated that the $C_{1-20}$alkyl cross-linker may be provided by any alkyl as described above or herein having a 1 to 20 atom chain. For example, the $C_{1-20}$alkyl cross-linker may be optionally substituted with one or more functional groups selected from at least alkyl, halo, hydroxyl, or amine, and optionally interrupted with one or more O, N, Si or S. In other examples the cross-linking agent may be a $C_2$-$C_{20}$alkyl, $C_5$-$C_{20}$alkyl, $C_{10}$-$C_{20}$alkyl or $C_{12}$-$C_{10}$alkyl, according to any example as described herein.

In some embodiments, the cross-linking agent may be selected to provide a $C_1$-$C_{10}$alkyl cross-linker in the cross-linked hydrophilic polymer. It will be appreciated that the $C_{1-10}$alkyl cross-linker may be provided by any alkyl as described above or herein having a 1 to 10 atom chain. For example, the $C_{1-10}$alkyl cross-linker may be optionally substituted with one or more functional groups selected from at least alkyl, halo, hydroxyl, or amine, and optionally interrupted with one or more O, N, Si or S. In other examples the cross-linking agent may be a $C_2$-$C_{10}$alkyl, $C_3$-$C_{10}$alkyl, $C_4$-$C_{10}$alkyl or $C_5$-$C_{10}$alkyl, according to any example as described herein.

The cross-linking agent may be selected to provide a heteroalkyl cross-linker in the cross-linked hydrophilic polymer. The heteroalkyl group may be provided by an alkyl as described herein or any example thereof, which is interrupted by one or more heteroatoms (e.g. 1 to 3). The heteroatoms may be selected from any one or more of O, N, Si, S.

The cross-linking agent may be selected to provide a cycloalkyl cross-linker in the cross-linked hydrophilic polymer. The cycloalkyl cross-linker may be optionally substituted with one or more functional groups selected from alkyl, halo, hydroxyl, or amine, and optionally interrupted with one or more O, N, Si or S. The cycloalkyl group may be an alkylcycloalkyl group, for example. The cycloalkyl group may have 1-3 cyclic groups linked and/or fused together.

The cross-linking agent may be selected to provide an arylalkyl cross-linker in the cross-linked hydrophilic polymer. The arylalkyl cross-linker may be optionally substituted with one or more functional groups selected from any one or more of halo, hydroxyl, carboxyl, or amine, and optionally interrupted with any one or more O, N, Si or S. The arylalkyl cross-linker may have 1 to 3 aryl groups, for example, each of which may be linked and/or fused together.

The cross-linking agent may be selected to provide a heteroarylalkyl cross-linker in the cross-linked hydrophilic polymer. It will be appreciated that the heteroarylalkyl may be any arylalkyl group that is interrupted by one or more heteroatoms. The heteroatoms may be selected from any one or more of O, N, Si, S.

In some embodiments, the cross-linking agent is an epoxide (i.e. an epoxide cross-linker). For example, the epoxide can provide a bivalent or polyvalent linking group in the cross-linked hydrophilic polymer, which may comprise one or more hydroxyl groups arising from reaction of the epoxide groups with the hydrophilic poolymer. In some embodiments, the cross-linking agent comprises at least 1, 2, 3, 4 or 5 epoxides. In some embodiments, the cross-linking agent comprises 2 epoxides. In one embodiment, the cross-linking agent is an epoxide. In one embodiment the epoxide is a diepoxide (e.g. comprises 2 epoxide groups, for example BDDE). In one embodiment, the epoxide is a triepoxide (e.g. comprises 3 epoxide groups, for example TTE). In one embodiment, the cross-linking agent is 1,3-butadiene diepoxide (BDDE) or triglycidyl trimethylolpropane ether (TTE or TMPTGE). In some embodiments, the hydrogel comprises a cross-linked polyamine or copolymer thereof. In some embodiments, the hydrogel comprises a cross-linked polyacrylamide or co-polymer thereof. In some embodiments, the hydrogel comprises a cross-linked polyamine or a cross-linked polyacrylamide, or copolymers thereof.

The cross-linking agent may be selected from the group consisting of triglycidyl trimethylolpropane ether (TTE or TMPTGE) (also referred to as trimethylolpropane triglycidyl ether), diglycidyl ether, Resorcinol diglycidyl ether (CAS Number: 101-90-6), Bisphenol A diglycidyl ether, 1,3-Butadiene diepoxide, Diglycidyl 1,2-cyclohexanedicarboxylate, Diglycidyl hexahydrophthalate, Poly(ethylene glycol) diglycidyl ether average (<Mn 1000), Glycerol diglycidyl ether, 1,4-Butanediol diglycidyl ether, Bisphenol F diglycidyl ether, Bisphenol A propoxylate diglycidyl ether, Bisphenol A propoxylate diglycidyl ether PO/phenol 1, N,N-Diglycidyl-4-glycidyloxyaniline, N,N-Diglycidyl-4-glycidyloxyaniline, Poly(dimethylsiloxane), diglycidyl ether terminated (Mn<1000), Neopentyl glycol diglycidyl ether, 2,2-Bis[4-(glycidyloxy)phenyl]propane, 4,4'-Isopropylidenediphenol diglycidyl ether, BADGE, Bisphenol A diglycidyl ether, D.E.R.™ 332, Bis[4-(glycidyloxy)phenyl] methane, Tris(4-hydroxyphenyl) methane triglycidyl ether, Tris(2,3-epoxypropyl) isocyanurate, 4,4'-Methylenebis(2-methylcyclohexylamine). Other suitable cross linking agents may also comprise one or more isothiocyanates, isocyanates, acyl azides, NHS esters, sulfonyl chlorides, aldehydes, glyoxals, epoxides, oxiranes, carbonates, aryl halides, imidoesters, carbodiimides, anhydrides, and fluorophenyl ester groups.

The cross-linking agent may comprise an aldehyde group, for example at least one, two, or three aldehyde groups. For example, the cross-linking agent may be formaldehyde or glutaraldehyde. In one embodiment, the hydrophilic polymer is a polyacrylamide, derivative, or copolymer thereof cross-linked with an aldehyde, for example formaldehyde or glutaraldehyde.

The cross-linking agent may comprise two or more vinyl groups ($-C{=}CH_2$). For example, the cross-linking agent may be a divinyl cross-linking agent, such as N, N-methylenebisacrylamide or ethyleneglycol dimethacrylate. In some embodiments, the hydrophilic polymer is a polyacrylamide, derivative, or copolymer thereof, cross-linked with N, N-methylenebisacrylamide via a free-radical initiated vinyl polymerization mechanism, for example to form a poly(acrylamide-co-methylenebisacrylamide) hydrogel that is held together by covalent bonds.

Other suitable cross-linking agents include ethylene glycol dimethacrylate and piperazine diacrylamide.

In one embodiment, the cross-linked hydrophilic polymer comprises poly(acrylamide-co-acrylic acid) or a partial sodium or potassium salt thereof, that is cross-linked with 1-ethyl-3-(3-dimethylaminopropyl) carbodiimide (EDC) and N-hydroxysuccinimide (NHS) and multifunctional amines.

The hydrophilic polymer may be ionically-cross linked (e.g. linked by ionic interactions (i.e. an electrostatic attraction between oppositely charged ions). For example, the ionic-cross linking may be a charge interaction between the hydrophilic polymer and an oppositely charged molecule as the linker. This charged small molecule may be a polyvalent cation or anion. The oppositely charged molecule may also be a polymer. The ionic-cross linking may also be between two hydrogel forming polymers of the opposite charge. In some embodiments, the hydrophilic polymer is cross-linked by metallic cross-linking agent, for example a polyvalent cation. The term "polyvalent cation" refers to a cation with a positive charge equal or greater than +2. In some embodiments, the hydrogel is ionically cross-linked by divalent cations or trivalent cations, or mixtures thereof. In some embodiments, the polyvalent cation is a divalent cation. As used herein, the term "divalent cation" is intended to mean a positively charged element, atom or molecule having a valence of +2. The divalent cation may be selected from one or more of $Ca^{2+}$, $Mg^{2+}$, $Sr^{2+}$, $Ba^{2+}$, $Zn^{2+}$, or $Be^{2+}$, and salt forms of these cations (e.g. $CaCl_2$)). In other embodiments, the polyvalent cation is a trivalent cation. As used herein, the term "trivalent cation" is intended to mean a positively charged element, atom, or molecule having a valence of +3. The trivalent cation may be selected from one or more of $Fe^{3+}$, $Cr^{3+}$, $Al^{3+}$, or $Mn^{3+}$, and salt forms of these cations (e.g. $AlCl_3$). In some embodiments, the cross-linking agent is a mixture of both divalent and trivalent cations, both of which may be selected from the cations as described herein.

Processes for $CO_2$ Capture/Release and Regeneration of Hydrogel

The $CO_2$ may be removed from the gaseous stream by being absorbed into a hydrogel. In some embodiments, the hydrogel is capable of absorbing between about 10 mg of $CO_2$ per g of hydrogel (mg/g) to about 300 mg/g $CO_2$. In some embodiments, the hydrogel is capable of absorbing at least about 10, 20, 30, 40, 50, 60, 70, 80, 90, 100, 120, 150, 200, 250 or 300 mg/g $CO_2$. In other embodiments, the hydrogel is capable of absorbing less than about 300, 250, 200, 150, 120, 100, 90, 80, 70, 60, 50, 40, 30, 20 or 10 mg/g $CO_2$. Combinations of these absorption values are possible, for example the hydrogel is capable of absorbing between about 10 mg/g to about 80 mg/g $CO_2$, between about 20 mg/g to about 70 mg/g $CO_2$, or between about 100 mg/g to about 300 mg/g, or between about 200 mg/g to about 300 mg/g.

In some embodiments, at least about 50% of $CO_2$ is removed from the gaseous stream (e.g. at least about 50% of $CO_2$ is absorbed into the hydrogel from the gaseous stream). In some embodiments, at least about 50%, 85%, 90%, 95%, 99% or 99.9% of $CO_2$ is removed from the gaseous stream. In some embodiments, between about 50% to about 99% of $CO_2$ is removed from the gaseous stream.

The gaseous stream contacts the hydrogel (e.g. passes through a bed comprising the hydrogel) resulting in an effluent gaseous stream following contact with the hydrogel. As described above, before contact with the hydrogel, the gaseous stream has an initial $CO_2$ concentration. After contact with the hydrogel, the effluent gaseous stream has an effluent $CO_2$ concentration. The concentration of $CO_2$ in the effluent gaseous stream following contact with the hydrogel may be measured to determine the concentration of $CO_2$ remaining in the gaseous stream.

In some embodiments, over time, the concentration of $CO_2$ in the effluent gaseous stream following contact with the hydrogel may increase indicating reduced or no more $CO_2$ absorption is taking placed upon contact of the gaseous stream with the hydrogel (e.g. indicating the hydrogel is "saturated" (e.g. spent) and little to no more $CO_2$ absorption is occurring). This can act as an indicator to replace and/or regenerate the hydrogel to continue $CO_2$ capture. The concentration of $CO_2$ in the effluent gaseous stream may be measured by any suitable means, for example using an in-line calibrated cavity ring-down IR spectrometer.

In some embodiments, the hydrogel may be enclosed in a suitable chamber, wherein the chamber comprises one or more inlets through which the gaseous stream can flow to contact the hydrogel enclosed therein, and one or more outlets through which the effluent stream can flow out from the chamber. Alternatively, the hydrogel may be enclosed in a suitable chamber comprising one or more openings through which the gaseous stream can diffuse through (e.g. absent a back pressure/flow rate) to contact the hydrogel enclosed therein. It will be appreciated that the chamber can take a number of forms provided the gaseous stream can access the hydrogel. In one embodiment, the chamber may be a packed-bed column as described herein.

In some embodiments, the hydrogel may be provided as a bed, wherein the contacting the gaseous stream with the hydrogel comprises passing the gaseous stream through the bed comprising the hydrogel. In one embodiment, the hydrogel is provided as a packed-bed reactor. In other embodiments, the contacting the gaseous stream with the hydrogel comprises introducing a flow of the hydrogel into the gaseous stream, for example using a fluidised bed reactor.

The hydrogel may be contacted with the gaseous stream for any suitable period of time, for example until the hydrogel is spent and no more $CO_2$ absorption is occurring. In one embodiment, the hydrogel is in contact with the gaseous stream until the concentration of $CO_2$ in the effluent gaseous stream is the same as the initial concentration of $CO_2$ of the gaseous stream. In some embodiments, the hydrogel is in contact with the gases stream for at least about 5, 10, 30, 60 seconds (1 minute), 10, 15, 20, 30, 45, 60 minutes (1 hour), 2, 5, 10, 24, 48 or 36 hours.

In some embodiments, the hydrogel provides various rates of $CO_2$ absorption. In one embodiment, the rate of $CO_2$ absorption can be measured by monitoring the $CO_2$ concentration of the effluent gaseous stream over time. For example, the concentration of $CO_2$ in the effluent gaseous stream may be less than about 50% of the initial $CO_2$ concentration after about 20 minutes of contact with the hydrogel. In some examples, the concentration of $CO_2$ in the effluent gaseous stream may be less than about 5% of the initial $CO_2$ concentration after about 100 seconds of contact with the hydrogel (in other words at least about 95% of $CO_2$ is removed from the gaseous stream after 100 seconds). Other rates of $CO_2$absorption are also possible.

The $CO_2$ after absorption in the hydrogel can be released by breaking the bonds between the $CO_2$ and the amine groups. This can be achieved through using temperature (through heating) or pressure (through vacuum). This may involve heating the column containing the hydrogel or passing through a hot gas stream (e.g. steam) or hot air. Such desorption may be provided by any suitable environment capable of providing a heated environment (e.g. temperature) or a pressurised environment (e.g. through vacuum), or a combination thereof, in contact with or surrounding the hydrogel which can desorb at least some of the $CO_2$ absorbed within the hydrogel. Such desorption environment can operate in an "on" or "off" state. For example, once the concentration of $CO_2$ in the effluent gaseous stream following contact with the hydrogel has increased to a level indicating reduced or no more $CO_2$ absorption is taking place, the desorption environment may be switched "on" to desorb $CO_2$ from the hydrogel.

The processes as disclosed herein may be conducted at ambient temperatures, for example ranging from about 10 to 35° C. The processes may also be conducted generally around typical atmospheric pressures (e.g. between about 90 and 105 kPa, and more typically about 101 kPa). For example, ambient temperature may be between 15 and 30° C., or 20 to 25° C.

The processes using the hydrogels as described herein are also suitable for use in environments with low or high humidity. Low humidity in this instance means partial water vapor pressures of less than about 5 mb. At about 21° C., this corresponds to a relative humidity of around 20% or less. High humidity in this instance means partial water vapor pressures of more than about 5 mb. At about 21° C., this corresponds to a relative humidity of greater than about 20%. Relative humidity is defined as follows.

$$\text{Relative Humidity} = \frac{\text{Actual vapor pressure}}{\text{Saturated vapor pressure}} \times 100\%$$

Saturated vapor pressures for water are well known and change depending on the temperature (Donald Ahrens, 1994, *Meteorology Today—an introduction to weather, climate and the environment* Fifth Edition—West Publishing Co). As a consequence, the water vapor pressure will change with temperature for a given relative humidity. An illustration of this is provided below (http://ww2010.atmos.uiuc.edu/%28Gh %29/guides/mtr/cld/dvlp/rh.rxml, downloaded December 2014).

| Temperature (° C.) | 20% Relative Humidity Partial Water Vapor Pressure (mb) | 80% Relative Humidity Partial Water Vapor Pressure (mb) | 100% Relative Humidity Saturated Water Vapor Pressure (mb) |
|---|---|---|---|
| 10 | 2.5 | 9.8 | 12.3 |
| 15 | 3.4 | 13.6 | 17.1 |
| 20 | 4.7 | 18.7 | 23.4 |
| 25 | 6.3 | 25.4 | 31.7 |
| 30 | 8.5 | 34.0 | 42.5 |
| 35 | 11.3 | 45.0 | 56.3 |

While the process is effective for use in environments with low humidity, it is also effective at a higher humidity where other treatments may not be effective. In other words, one of the advantages of the present process and hydrogels are that they can be used across a relatively broad application window (e.g. combination of broad parameters of temperature, pressure and humidity), and in particular across a broad humidity range, even though a further particular advantage is its use at higher humidity.

The process may, for example, be performed at a relative humidity of less than about 90%, 80%, 70%, 60%, 50%, 40%, 30%, 20%, 18%, 16%, 14%, 12%, 10%, 8%, 6%, 4%, or 2%. The process may be performed at a relative humidity of greater than about 1%, 2%, 4%, 6%, 8%, 10%, 12%, 14%, 16%, 18%, 20%, 30%, 40%, 50%, 60%, or 70%. The process may be performed at a relative humidity of between any two of these values, for example between about 1% and about 90%, about 2% and about 50%, about 10% and about 70%, about 2% and about 30%, about 1% and about 20%, or about 4% and about 18%. It will be appreciated that the relative humidity for a given partial water vapor pressure depends on temperature. The partial water vapor pressure and temperature are independent variables and relative humidity (RH) is a dependent variable although there is a constraint that the relative humidity cannot exceed 100% at any particular temperature. For example, any one or more of the above relative humidity values may be provided where the temperature is between about 10 to 45° C., between about 15 and 40° C., or between about 20 to 35° C. The above relative humidity values may for example be where the temperature is at value of about 15° C., 16° C., 17° C., 18° C., 19° C., 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., or 45° C. The application window for the process as presently disclosed may be any combination of the above RH and temperature ranges or values. For example, the application window may be where the RH is between about 1% and about 70% and a temperature range between about 15° C. and about 40° C.

The humidity may be provided by a partial water vapour pressure (in mb) of less than about 60, 50, 40, 30, 20, 15, 14, 13, 12, 11, 10, 9, 8, 7, 6, 5, 4, 3, or 2. The humidity may be provided by a partial water vapour pressure (in mb) of more than about 1, 2, 3, 4, 5, 6, 7, 8, 9, 10, 11, 12, 13, 14, 15, 20, 30, 40, 50, 60. The humidity may be provided by a partial water vapour pressure (in mb) between any two of these values, for example between about 1 and about 50, such as about 2 and about 25, such about 3 and about 15, such as about 4 and about 10. The humidity may be provided by a given temperature according to a temperature value or range as described above, although it will be appreciated that the temperature values are such that the humidity does not exceed 100% relative humidity or its partial vapour pressure does not exceed its saturated vapour pressure. The relative humidity at a given temperature for any of these partial water vapour pressure values may for example be less than about 90%, 80%, 70%, 60%, 50%, 40%, 30%, or 20%.

EXAMPLES

In order that the disclosure may be more clearly understood, particular embodiments of the invention are described in further detail below by reference to the following non-limiting experimental materials, methodologies and examples.

General Materials

All chemicals are purchased from commercial sources and are used as supplied. Branched PEI (Mw~800), branched PEI (Mw~25,000) PEI solution (Mw~750,000, 50 wt. % in $H_2O$), monoethylene glycol (MEG), triglycidyl trimethylolpropane ether (TMPTGE or TTE, cross-linker), 1,3-Butadiene diepoxide (BDDE, cross-linker) were supplied by Sigma-Aldrich. Branched PEI (Mw~1,800) and branched PEI (Mw~10,000) were obtained from Alfa Aesar. Distilled water was used in the preparation of PEI solutions. Ambient air was used for the direct air capture studies.

Example 1: Fabrication of Polyethylenimine Hydrogel Particles ("PEI Snow")

To fabricate polyethylenimine hydrogel particles ("PEI Snow"), 9 g of PEI aqueous solution with concentrations ranging from 10 wt. % to 50 wt. % was added into a 20 mL plastic sample vial. Subsequently, 1 g of aqueous BDDE cross-linking solution with varying concentrations was also added into the same vial to initiate the PEI crosslinking at the ambient temperature. The crosslinking reaction terminated within 30 min depending on the PEI type and the amount of the cross-linker (BDDE) and eventually a bulk PEI gel was produced. Afterward, the PEI gel was vigorously ground using a glass stirring rod to obtain a snow-like material that had an average particle size of 200~300 μm.

For the majority of the measurements, the PEI hydrogel was applied as prepared for the uptake measurements without being pre-treated or dried prior to use. As a result, the as prepared PEI hydrogel is swollen with water. A schematic of the PEI hydrogel preparation can be seen in FIG. 1.

For the materials that do not contain water as the liquid swelling gent, the same procedure was followed above, but the alternative liquid swelling agent was added by (1) drying the aqueous PEI using a vacuum oven and re-swelling in the target solvent; (2) synthesizing the polymer in the alternative solvent so dissolving the starting materials in the target solvent.

Dry PEI hydrogels (i.e. no liquid swelling gent) were prepared by drying aqueous PEI snow prepared above in a vacuum oven to remove the water liquid swelling agent.

Example 2: Swelling Experiments

The maximum swelling capacity in each solvent can be determined using the following method. In order to measure the uptake capacity of the hydrogels, an accurate mass of dried hydrogel was added to a pre-weighed poly-prep chromatography columns (Bio-Rad). An excess of the target solvent is added to fully cover the hydrogel in each cartridge and the samples were swelled for 96 hours at 25° C. The excess solvent was then removed by filtrating under pressure. The cartridge and swelled samples were re-weighed to determine the water uptake.

Example 3: Screening of Suitable Hydrogels for Direct Air Capture

Figure 2:
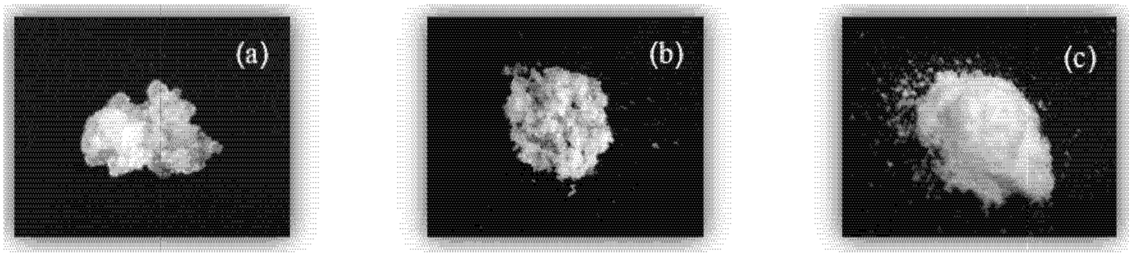
FIG. 2: Ground PEI hydrogels with (a) low rigidity (b) intermediate (c) high rigidity. The PEI gels with the most rigid structure allow for the successful fabrication of PEI snow. (a) 30.0 wt. % PEI~1,800/6.0 wt. % BDDE; (b) 30.0 wt. % PEI~25,000/1.0 wt. % BDDE; (c) 30.0 wt. % PEI~750,000/1.0 wt. % BDDE
Figure 3:
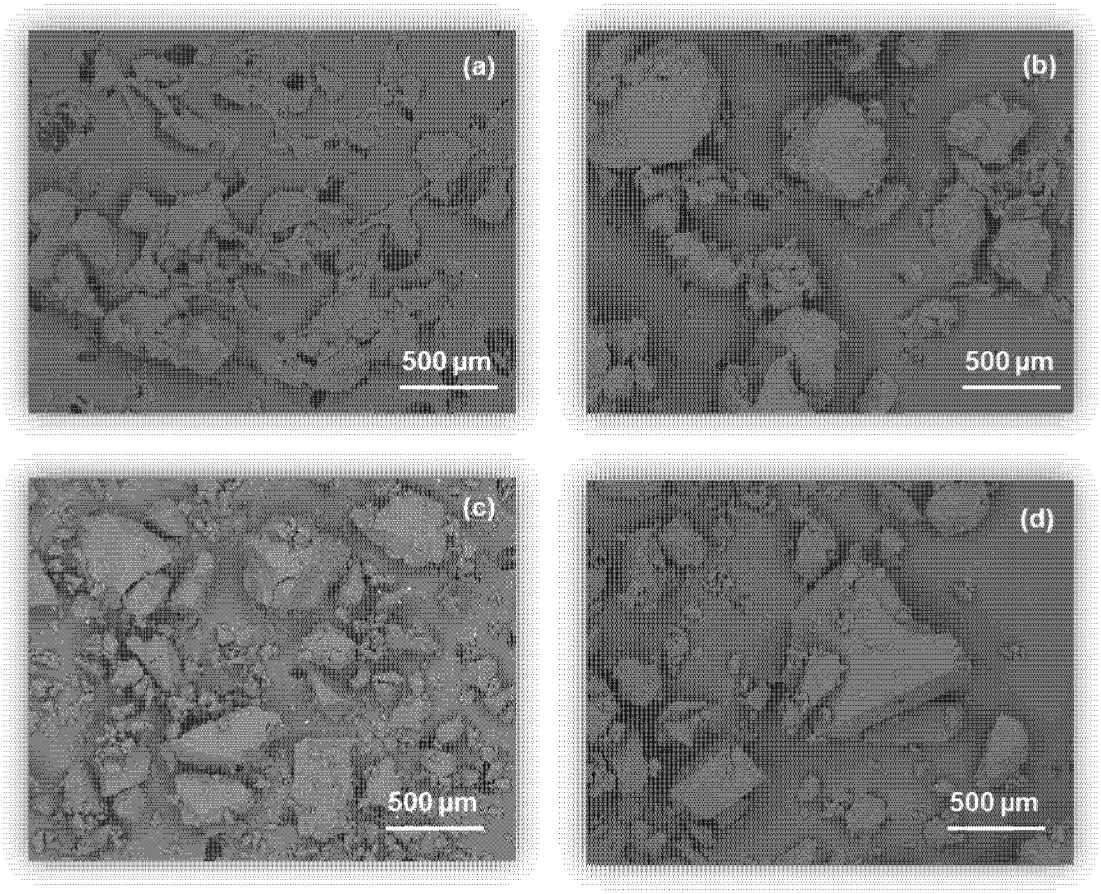
FIG. 3: SEM images of typical PEI hydrogel snow particles with varying rigidities. (a) 30.0 wt. % PEI~1,800 with 6.0 wt. % BDDE (low rigidity); (b) 30.0 wt. % PEI~10,000 with 1.0 wt. % BDDE (intermediate rigidity); (c) 30.0 wt. % PEI~25,000 with 2.0 wt. % BDDE (high rigidity); (d) 30.0 wt. % PEI~25,000 with 4.0 wt. % BDDE (extremely high rigidity).

The PEI particles with varying rigidities (i.e. degree of cross-linking and PEI molecular weight) and mechanical properties are illustrated in FIG. 2. SEM images showing the rigidity variation are provided in FIG. 3. To identify the best possible formulations for $CO_2$ capture purpose, screening studies were conducted investigating the effect of both PEI molecular weight and BDDE levels at ambient conditions. The BDDE concentrations were based on the weight of the solution after the mixing. PEI aqueous solution with a concentration of 30 wt. % was applied for all the screening experiments. The results are summarized in Table 1.

TABLE 1

Effect of PEI type, PEI concentration and BDDE level on the fabrication of PEI snow (ambient conditions).

| PEI type | PEI conc. (wt. %) | BDDE conc. (wt. %) | Gelation (√/x) | Gelation timing (min) | Gel rigidity |
|---|---|---|---|---|---|
| PEI (Mw~800) | 30 | 1 | x | — | — |
| | | 3 | x | — | — |
| | | 6 | x | — | — |
| PEI (Mw~1,800) | 30 | 1 | x | — | — |
| | | 3 | x | — | — |
| | | 6 | √ | 45.7 | low |
| PEI (Mw~10,000) | 30 | 1 | √ | 12.3 | intermediate |
| | | 2 | √ | 10.3 | high |
| | | 4 | √ | 8.1 | high |
| PEI (Mw~25,000) | 30 | 1 | √ | 8.4 | high |
| | | 2 | √ | 7.6 | high |
| | | 4 | √ | 5.9 | high |

TABLE 1-continued

Effect of PEI type, PEI concentration and BDDE level on the fabrication of PEI snow (ambient conditions).

| PEI type | PEI conc. (wt. %) | BDDE conc. (wt. %) | Gelation (√/x) | Gelation timing (min) | Gel rigidity |
|---|---|---|---|---|---|
| PEI (Mw~750,000) | 30 | 1 | √ | 5.3 | high |
| | | 2 | √ | 4.0 | Intermediate-high |
| | | 4 | √ | 2.6 | Intermediate-high |

Note:
Both the PEI and BDDE concentrations were based on the weight of the solution after mixing When PEI~10,000 was used with increased amounts of BDDE concentration (i.e. 2.0 and 4.0 wt. %), this led to significantly reduced gelation time and improved the rigidity and stiffness. This was principally due to the longer PEI chains (i.e. higher molecular weight) and greater crosslinking density (i.e. higher BDDE level). When the PEI molecular weights were further increased to ~25,000 and even ~750,000), even at the lowest BDDE concentration of 1.0 wt. %, PEI gels with reasonable rigidity for grinding could be readily formed. This demonstrated that the impact of PEI molecular weights might outweigh the impact of the BDDE level. The gelation time for PEI~25,000 and PEI~750,000 also negatively correlated with BDDE level and gels could be readily generated in less than 10 minutes. Based on the results of screening experiments, the PEI~10,000, PEI~25,000 and PEI~750,000 was chosen as raw materials for the preparation of PEI gels and PEI snow. By investigating the effect of Mw and cross-linker concentration, regions of the composition space where the correct material properties can be generated were highlighted to provide unique hydrogel materials that can compete favourably with other solid adsorbents.

Example 4: FTIR and TGA-MS Characterisation of PEI Hydrogels

Figure 4:
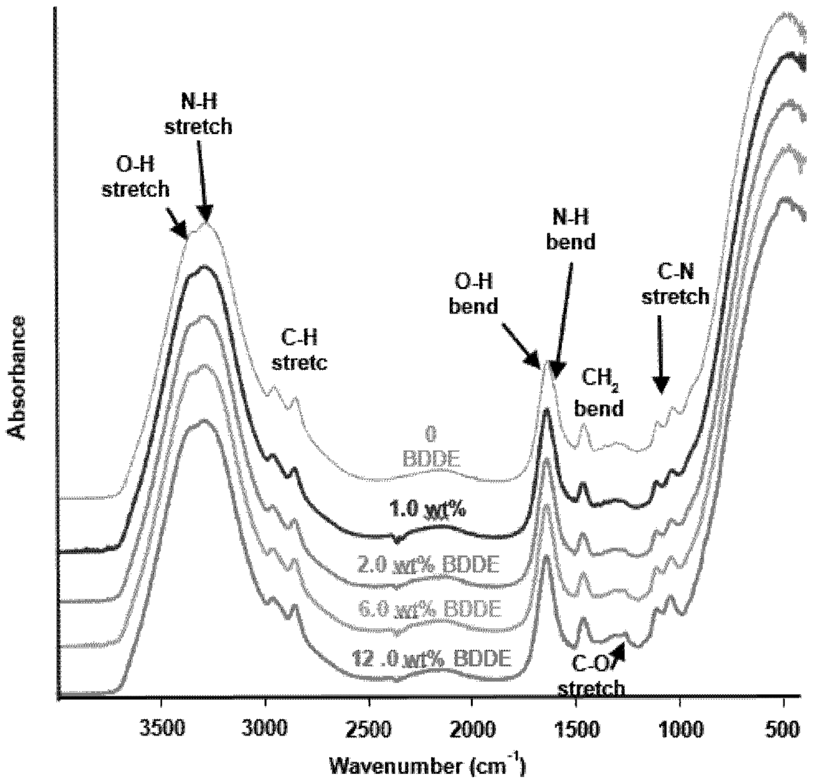
FIG. 4: IR spectrum of PEI reacting with various amounts of BDDE (PEI~25,000 concentration 30.0 wt. %)
Figure 5:
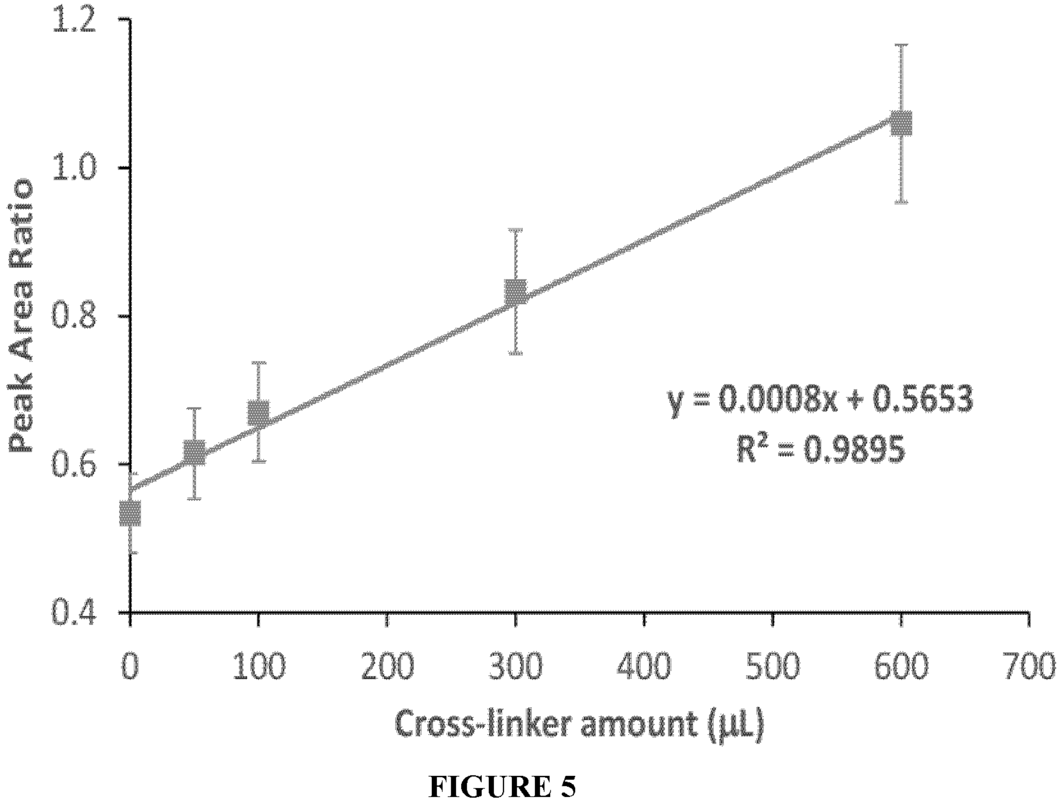
FIG. 5: Variation in peak area ratio (of C—N to C—H band intensity) versus the BDDE concentration used. The peaks corresponding to the C—N and C—H stretching vibrations were integrated and the ratio (C—N band at ~1100 $cm^{-1}$ versus the C—H band at ~2900 cm 1) was determined. It is evident that the proportion of the C—N band increases relative to the C—H band and the change is linear ($R^2$~0.98). This confirms that the BDDE has reacted with the PEI. Interestingly, the C—H peak intensity at ~2900 $cm^{-1}$ initially decreased but did not change significantly with higher cross-linker amounts (after 100 μL) whereas the intensity of the C—N peak ~1100 $cm^{-1}$ gradually increased.
Figure 6:
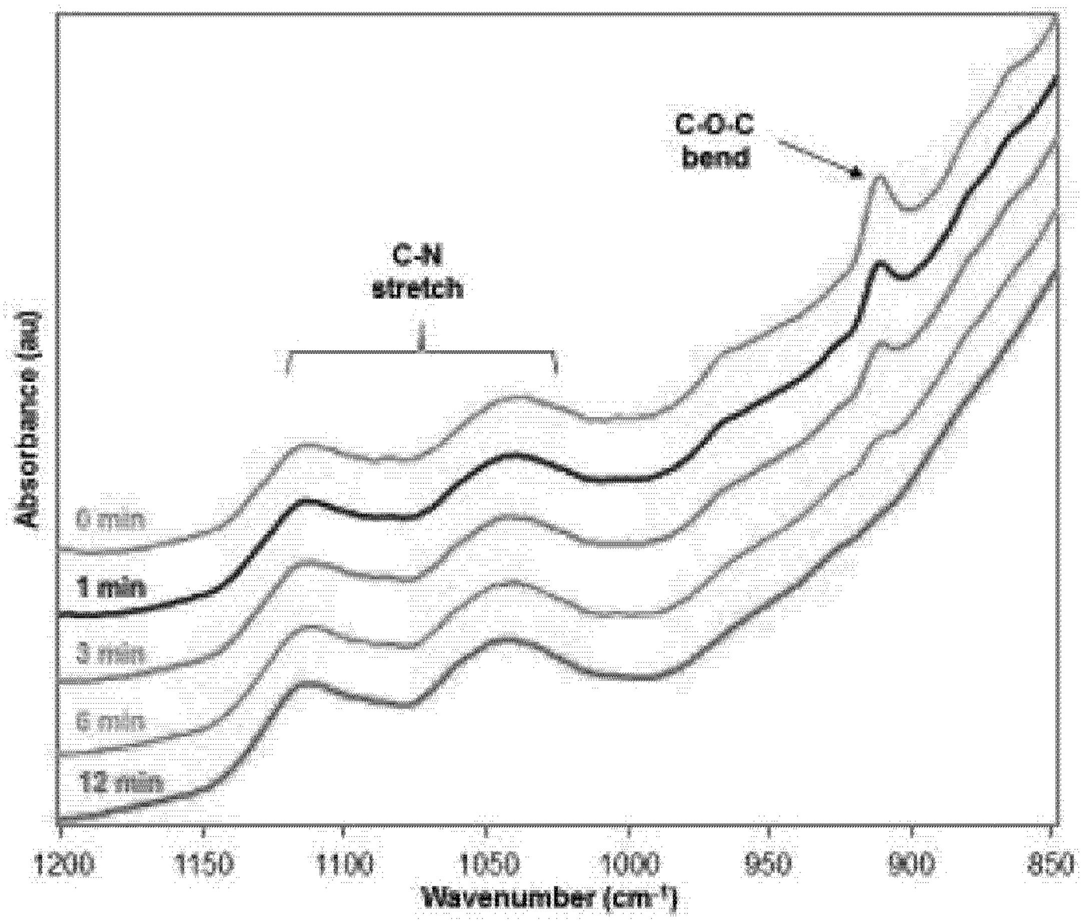
FIG. 6: Transient changes in the IR spectra of PEI when exposed to a known cross-linker concentration (300 μL). It is evident that the peak at 911 $cm^{-1}$ due to the C—O—C bending vibration decreases with time and this is consistent with the reaction of the epoxide groups on 1,3-butadiene with PEI. This study clearly shows that the reaction can be monitored in situ and that all of the BDDE is converted and almost none or very little of the unreacted BDDE remains in the PEI hydrogel.

In addition to the visual evidence, the crosslinking reaction of PEI and BDDE was also confirmed by detailed FTIR spectroscopy. Varying amounts of BDDE were added into 30 wt. % of PEI~25,000 solution and the FTIR results are illustrated in FIG. 4. Peaks were observed at 3349 $cm^{-1}$, 3289 $cm^{-1}$, 3000~2800 $cm^{-1}$, 1640 $cm^{-1}$, 1467 $cm^{-1}$ and 1111~1040 $cm^{-1}$ corresponding to the O—H stretch, N—H stretch, C—H stretch, OH bend, $CH_2$ bend, C—N stretch vibrations, respectively. A shoulder peak at ~1600 $cm^{-1}$ was also evident which was attributed to the —$NH_2$ bend vibration and this is consistent with the presence of primary amine groups. The intensity of a number of the IR bands (i.e., N—H stretch, C—H stretch and $NH_2$ bend) generally decreased with higher BDDE levels and this agrees favourably with chemical changes associated with the cross-linking process. However, the C—N peak intensity generally increased with BDDE amount suggesting that the epoxide was indeed reacting with the amine groups as was expected. The loss of the shoulder peak at ~1600 $cm^{-1}$ demonstrated that the PEI contained a lower amount of primary amines with increasing levels of BDDE. The peaks corresponding to the C—N and C—H stretching vibrations were integrated and the ratio of C—N band at ~1100 $cm^{-1}$ to the C—H band at ~2900 $cm^{-1}$ was determined (FIG. 5). It was evident that the proportion of the C—N band increased relative to the C—H band and the change was linear ($R^2$~0.98). This confirms that the BDDE had reacted with the PEI. The detailed assignments of these peaks and the transient change in the IR spectra of PEI when exposed to a given BDDE concentration are available in FIG. 6, and the Table 2

TABLE 2

Detailed assignments of the IR peaks of PEI snows~25,000 with varying amounts of BDDE

| BDDE Conc. (wt. %) | Peaks ($cm^{-1}$) | Comments/Summary |
|---|---|---|
| 0 | 3349, 3289, 2956, 2853, 1640, 1600 (sh), 1467, 1358, 1111, 1040, 465 | A shoulder peak at ~1600 cm-1 was evident. |
| 1.0 | 3338, 3292, 2958, 2854, 1640, 1600 (sh), 1468, 1359, 1113, 1039, 482 | Intensity of shoulder peak at ~1600 cm-1 reduced relative to 0 µl PEI. The peak intensities at 3338, 3289, 2956, 2853, 1467, 1113 and 1039 cm-1 decreased slightly. |
| 2.0 | 3350, 3290, 2957, 2855, 1639, 1600 (sh), 1467, 1360, 1113, 1040, 468 | Intensity of shoulder peak at ~1600 cm-1 was reduced relative to 0 µl PEI. The intensity of the peak at ~1359 cm-1 decreased. |
| 6.0 | 3338, 3293, 2957, 2855, 1641, 1600 (sh), 1462, 1262, 1114, 1043, 473 | Intensity of shoulder peak at ~1600 cm-1 was reduced relative to 0 µl PEI. New peak at ~1260 cm-1 was observed. A shoulder was observed at ~1090 cm-1. Intensity of region Between 1180-1010 cm-1 increased relative to 0 µl PEI. Peak at ~1359 cm-1 was lost. |
| 12.0 | 3337, 3294, 2956, 2852, 1641, 1600 (sh), 1461, 1313, 1261, 1110, 1044, 486 | Shoulder peak at ~1600 cm-1 was not evident. The intensity of peak at ~1260 cm-1 increased. A shoulder was observed at ~1090 cm-1. The peaks at 2852 and 1044 cm-1 shifted slightly relative to previous spectra. A weak peak appears at 1313 cm-1. |

Figure 7:
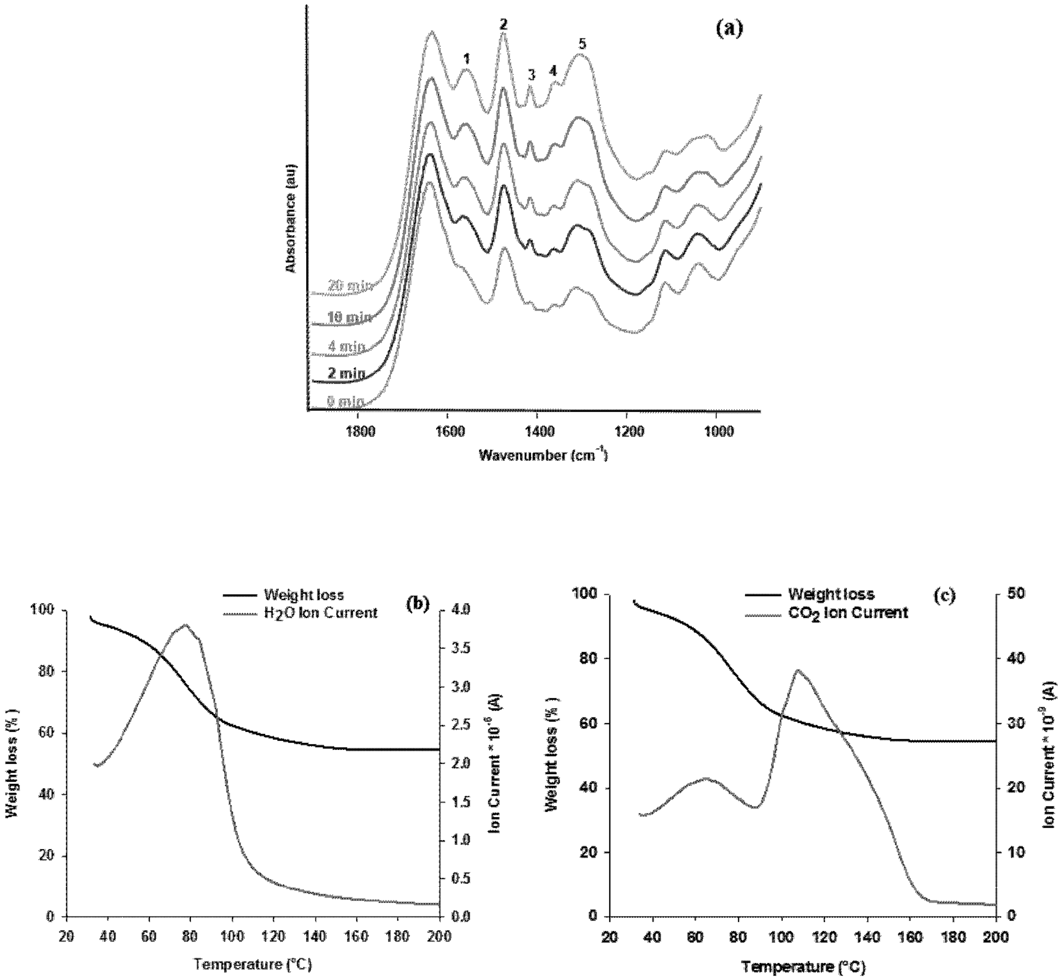
FIG. 7: (a) IR spectra of the PEI snow~25,000 with 2.0 wt. % BDDE and 30 wt. % PEI exposed to dry pure $CO_2$ (>99%) over time. (b) Weight loss and $H_2O$ ion current of the $CO_2$-loaded PEI snow~25,000. (c) Weight loss and $CO_2$ ion current of the $CO_2$-loaded PEI snow~25,000 (2.0 wt. % BDDE and 30 wt. % PEI)

To validate the $CO_2$ capture by the PEI snow, both the FTIR and TG-MS measurements were performed. FIG. 7*a* shows the IR spectra of the PEI snow~25,000 made with 2.0 wt. % BDDE and 30 wt. % PEI exposed to dry pure $CO_2$ (>99%) over time. As indicated, it was evident that a number of bands corresponding to $CO_2$ absorption appeared between 1600~1200 $cm^{-1}$ which had been previously described. In particular, new peaks at 1557, 1415 and 1359 $cm^{-1}$ increased with time which is consistent with the formation of a carbamate and carbonate/bicarbonate species. Furthermore, $CO_2$ absorption by the PEI snow was also validated by TG-MS. The PEI snow~25,000 was exposed to $CO_2$ for 30 minutes and heated from ambient temperature to 200° C. The weight loss during the heating process was recorded. Meanwhile, the composition of the evolved gases was continuously monitored and analysed by MS (FIGS. 7*b* and 7*c*). The total weight of the PEI snow dropped slowly at the initial stage but once the temperature reached 75° C., the weight loss became pronounced, and this was largely attributed to the evaporation of $H_2O$ as indicated by the increase in $H_2O$ signal in the MS analysis (FIG. 7*b*). The removal of $CO_2$ was completed at two stages (FIG. 7*c*). Small amounts of $CO_2$ were first released around 70° C., which was mainly due to the $CO_2$ adsorption on the particle surface. The majority of $CO_2$ was released from the intense $CO_2$/PEI interaction within the temperature range of 100-150° C. It was worth noting that the $CO_2$ was nearly completely removed at 170° C. After that, no $CO_2$ signal was detected by the MS.

Example 5: Direct Air Capture Using PEI Hydrogels

Figure 16:
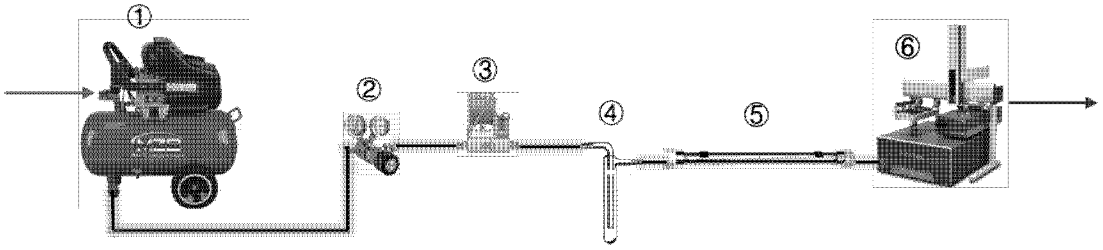
FIG. 16: Schematic of the experimental set-up for evaluating the DAC performance of the hydrogels. 1. Air compressor 2. Gas pressure gauge 3. Mass flow controller 4. Bubbler 5. Sample column 6. Isotopic analyzer.
Figure 17:
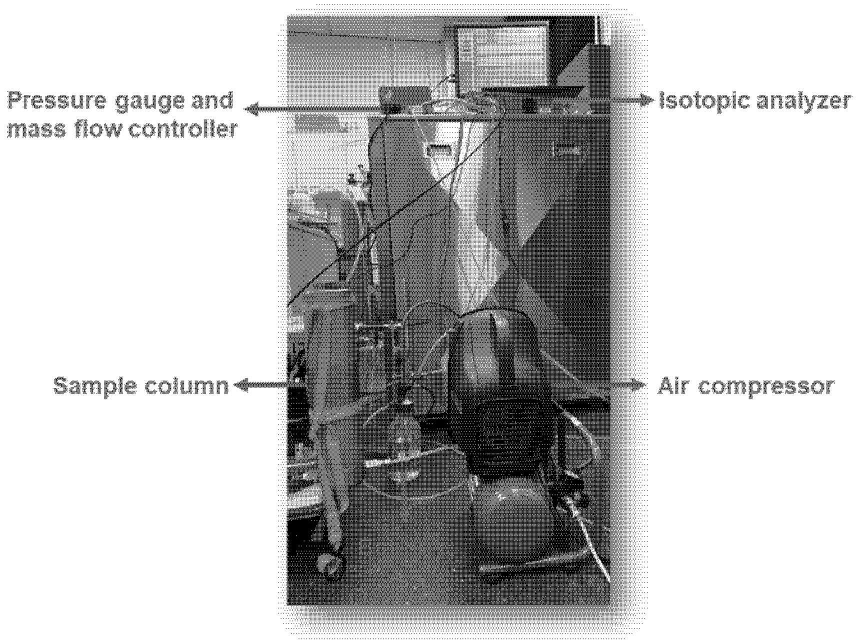
FIG. 17: Experimental set-up for evaluating the DAC performance of PEI snow at relatively large scale.

The hydrogels ability to capture $CO_2$ from ambient air (DAC) was investigated. In order to test the ability of the material for DAC using PEI snow, a G2201-i Isotopic Analyzer (PICARRO) was used to assess the DAC capacity of a $CO_2$ absorbent under ambient conditions (by measuring the effluent $CO_2$ concentration). The isotopic analyser uses an in-line calibrated cavity ring-down IR spectrometer. Ambient air was pumped into a column that held the PEI snow and recorded using the Isotopic Analyzer. The schematic of the experimental set-up is presented in FIG. 16.

Briefly, ambient air was continuously sucked in by a compressor and was introduced into the pipeline. The air flow rate was monitored and controlled by the mass flow controller (Bronkhorst® model F-201AV). A bubbler was installed at the inlet of the sample column to avoid the dehydration of the PEI snow caused by the ambient gas flow. For each measurement, PEI snow was loaded into the Swagelok column with a dimension of 0.5 m×½". Filter papers were positions at the inlet and outlet of the column to prevent the PEI snow contaminating the pipelines. The air with constant flow rate entered the sample column and interacted with the PEI snow, the residual $CO_2$ concentration in the effluent gas was identified by the isotopic analyzer throughout the experiments. The total amount of the absorbed $CO_2$ can be readily determined from the breakthrough curves.

A PEI hydrogel was prepared according to Example 1 (i.e. PEI hydrogel swollen with water). The Swagelok column was packed with the PEI hydrogel and then ambient air was flowed through the column at a flow rate of 10 standard L/m of at pressure ranging from ambient to 3 bar.

The concentration of $CO_2$ can be measured using the isotropic analyser that uses a an in-line calibrated cavity ring-down IR spectrometer, $CO_2$ concentrations were measured as low 10 ppm in the effluent gas demonstrating capture efficiency exceeding 95%, initially. Over time, as the material reacts with $CO_2$, the concentration in the effluent stream increases to ambient levels, where the hydrogel can be re-generated using heat or heat/steam.

Figure 8:
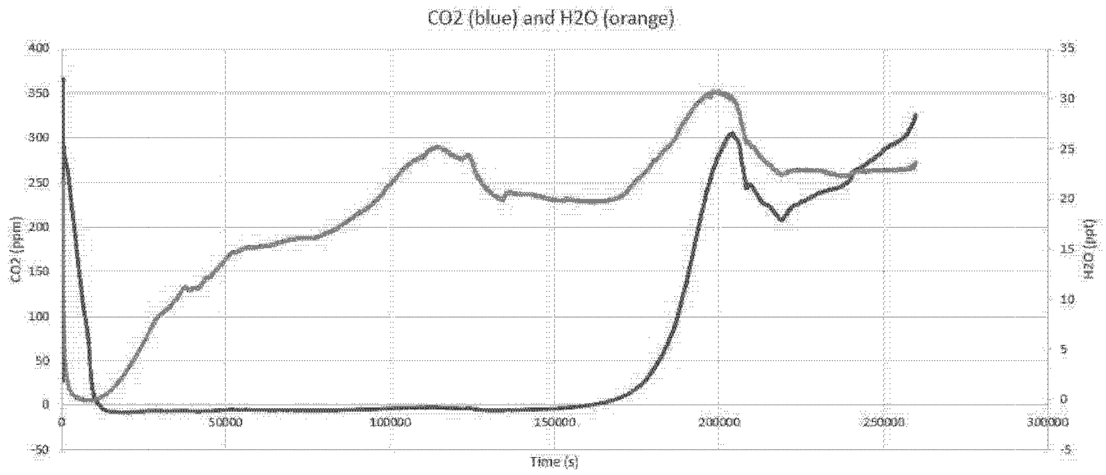
FIG. 8: DAC result of dry PEI snow (e.g. non swollen) showing absorption of $CO_2$ and residual moisture from ambient gaseous stream.

In one example, the PEI hydrogel absorbed essentially 100% $CO_2$ from the gaseous stream. As can be seen from FIG. 8, a dry PEI hydrogel (e.g. not swollen with any water or liquid swelling agent) was contacted with a gaseous stream of ambient air, where the dry hydrogel absorbed both $CO_2$ and residual moisture from the gaseous stream, indicative by the significant drop in $CO_2$ and $H_2O$ concentration in the effluent stream at the initial stages. The hydrogel maintained a high capture efficiency across 2 days (48 hours/175,000 seconds) with essentially about 100% $CO_2$ capture from the ambient stream resulting in an effluent $CO_2$ concentration of roughly zero ppm. After 2 days, the effluent $CO_2$ concentration increased indicating the hydrogel was reaching its maximum $CO_2$ absorption and becoming "spent". The hydrogel could then be regenerated by applying heat (e.g. steam) or pressure as outlined below in Example 9. Overall, the PEI hydrogel absorbed about 0.226 g of $CO_2$ and 2.00 g of $H_2O$ (10.6% $CO_2$ by weight, and 93.4% water by weight). The overall weight of the column increased by 2.6 g which correlated with the increased weight of the hydrogel owing to the absorption of $CO_2$ and $H_2O$ (86% match).

PEI hydrogels swollen with water and/or a liquid swelling agent also demonstrated effective absorption and removal of $CO_2$ from ambient air (see Examples 6 to 9). The hydrogels were tested under a flow of ambient air and the materials can effectively remove $CO_2$ from ambient air.

Example 6: Effect of Cross-Linking Concentration on Direct Air Capture

The degree of cross-linking in the hydrogel influenced the $CO_2$ absorption rate using direct air capture, where a comparison of the DAC performance of PEI hydrogels at two crosslinking levels (300 microliter and 600 microliter BDDE/1.5 g PEI) prepared according to Example 1 was evaluated. The hydrogels were placed into a column as described in Example 5, and ambient air was flowed through the hydrogel at a flow rate is 1000 mL/min. When the ambient air is dry it can be moistened with 10% water to mitigate any loss of water from the PEI hydrogel over time.

Figure 9:
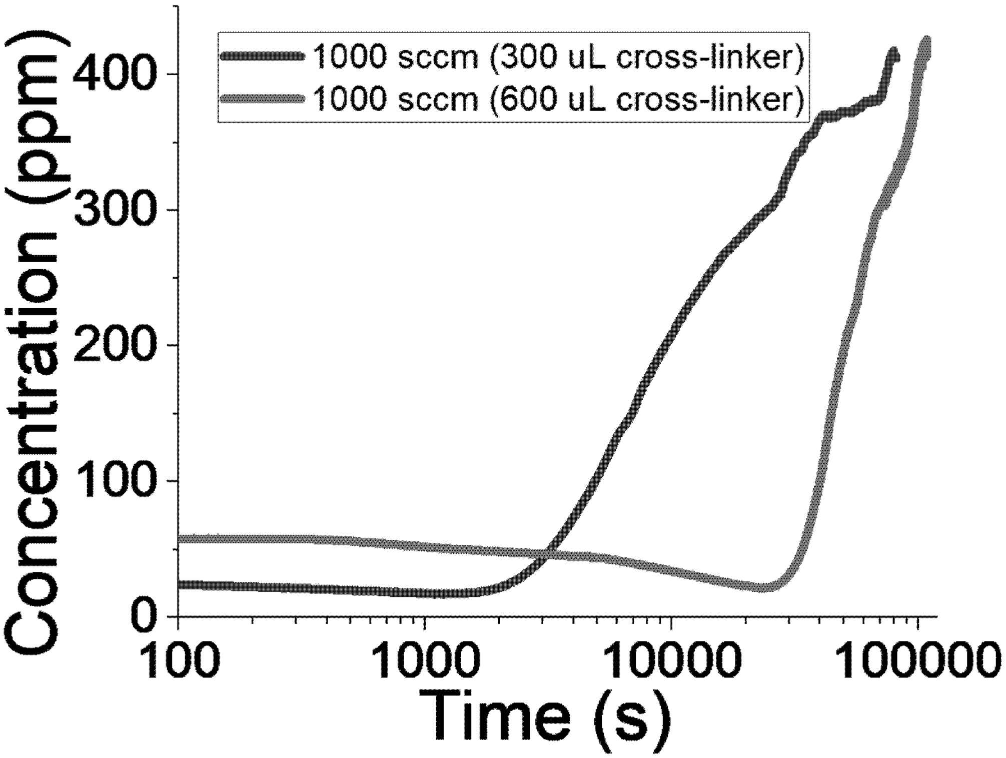
FIG. 9: Comparison of the DAC performance of PEI snows at two crosslinking levels (300 microliter and 600 microliter/1.5 g PEI) (The flow rate is 1000 ml/min).

As seen in FIG. 9, both hydrogels initially absorbed at least about 85% of the $CO_2$ from the ambient air stream. After about 2 hours of contact with the ambient air, the concentration of $CO_2$ in the effluent gaseous stream remained below 50% (e.g. below about 200 ppm) indicating $CO_2$ absorption and capture occurring in both hydrogels after prolonged contact with the gaseous stream. The hydrogel having the lower cross-linker density (300 microliter BDDE/1.5 g PEI) had lower $CO_2$ absorption as indicated by the quicker increase in the $CO_2$ concentration in the effluent stream over time.

Example 7: Effect of Flow Rates on the DAC Performance

Figure 10:
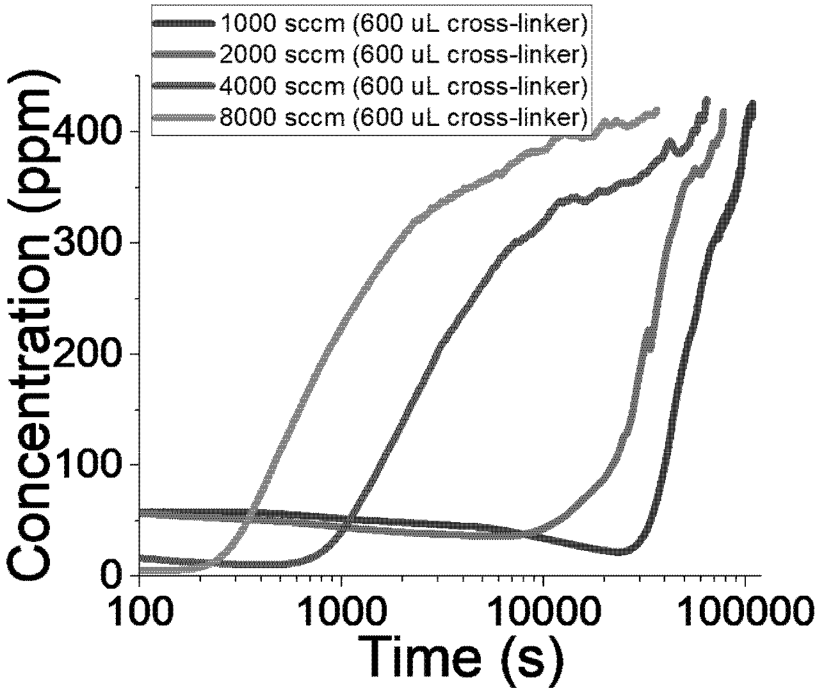
FIG. 10: Influence of flow rates on the DAC performance

The effect of the flow rate of the ambient air on DAC performance was investigated. A PEI hydrogel was prepared according to Example 1 using 600 microliter BDDE/1.5 g PEI. The hydrogels were placed into a column as described in Example 5, and ambient air was flowed through the hydrogel at varying flow rates of 1000, 2000, 4000, and 8000 mL/min (sccm). The ambient air was moistened with 10% water to mitigate any loss of water from the PEI hydrogel over time. As seen in FIG. 10, all of the hydrogels initially absorbed at least about 85% of the $CO_2$ from the gaseous stream. The faster the flow rate of the ambient air (e.g. 4000 and 8000 ml/min), the increase in rate of $CO_2$ absorption from the ambient stream as indicated by the quicker increase in the $CO_2$ concentration in the effluent stream over time.

Example 8: Direct Air Capture with PEI Snow Swollen with Glycerol

The direct air capture using hydrogels swollen with glycerol as the liquid swelling agent was investigated. The same procedure was followed from Example 1 but the glycerol swelling solvent was added by either (1) drying the aqueous PEI using a vacuum oven and re-swelling in the target solvent; or (2) synthesizing the PEI snow in the alternative solvent so dissolving the starting materials in the target solvent.

Figure 11:
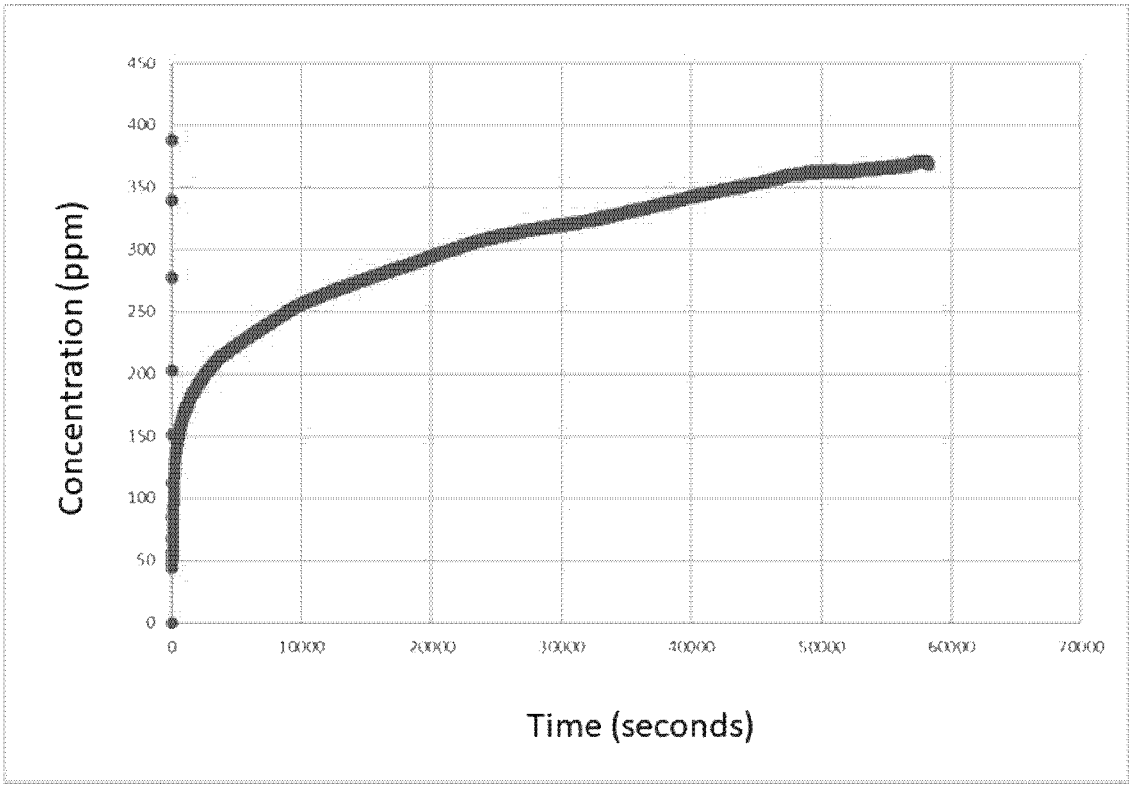
FIG. 11: DAC result of PEI snow dissolved in glycerol (mass ratio 2:1) at the flow rate of 1000 ml/min

The glycerol swollen cross-linked polyamine hydrogel (PEI snow) was packed into a column as outlined in Example 5, and ambient air was flowed through the swollen hydrogel at a flow rate of 1000 mL/min. The $CO_2$ concentration in the effluent stream was measured following the protocol in Example 5. As seen in FIG. 11, the capture efficiency exceeded 85% on initial exposure to the stream of ambient air.

Example 9: Absorption and Desorption of $CO_2$ from Hydrogels (Hydrogel Regeneration)

Figure 12:
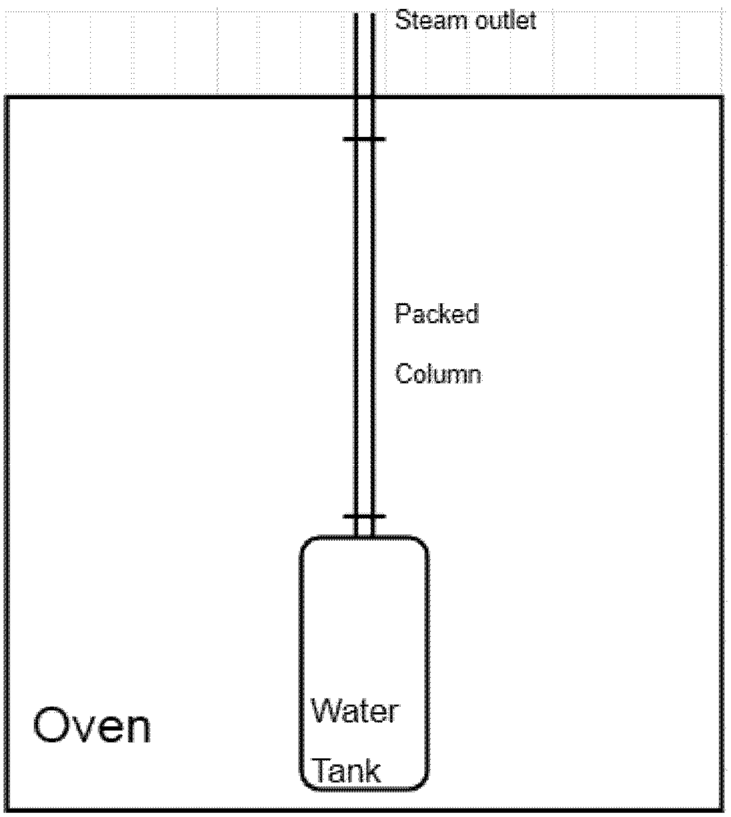
FIG. 12: Desorption using steam where a heated water tank is connected to the packed column with steam flowing through the material

The absorbed $CO_2$ within the hydrogel can be desorbed by applying heat, such as steam. Briefly, the steam was generated by evaporating water in the oven. The "spent" hydrogel (e.g. a hydrogel used in DAC where over time, the effluent stream increases to ambient levels indicating no more $CO_2$ capture is taking place) was packed in a column, with multiple filter papers at the top and bottom to keep the hydrogel in the column. The column was loaded on the water tank and the generated steam passed through the hydrogel. When steaming was completed, the column was weighed to see the amount of water the hydrogel had absorbed or desorbed. A schematic of the apparatus used to regenerate the hydrogel is provided in FIG. 12.

The oven was set at 120° C. at 1 bar, to generate superheated steam at a temperature of greater than 100° C., to ensure no condensation would happen inside the column and to ensure that the hydrogel/PEI snow doesn't dry out or absorb water. Nine cycles of absorption and desorption were performed, with an absorption time (e.g. contact time) of 40 minutes and a steaming time of 10 minutes.

For the absorption step, air was blown through until the measured outlet concentration $CO_2$ reached 405 ppm again. The outlet concentration was logged every second. A summary of the absorption and desorption conditions is provided in Table 3.

TABLE 3

| Regeneration cycle schedule | Duration (min) |
|---|---|
| Cycle 1 | |
| Absorption with CO2 from air | 40 |
| Steaming | 10 |
| Cycle 2 | |
| Absorption with CO2 from air | 40 |
| Steaming | 10 |
| Cycle 3 | |
| Absorption with CO2 from air | 40 |
| Steaming | 10 |
| Etc. for repeat cycles | |

Figure 13A:
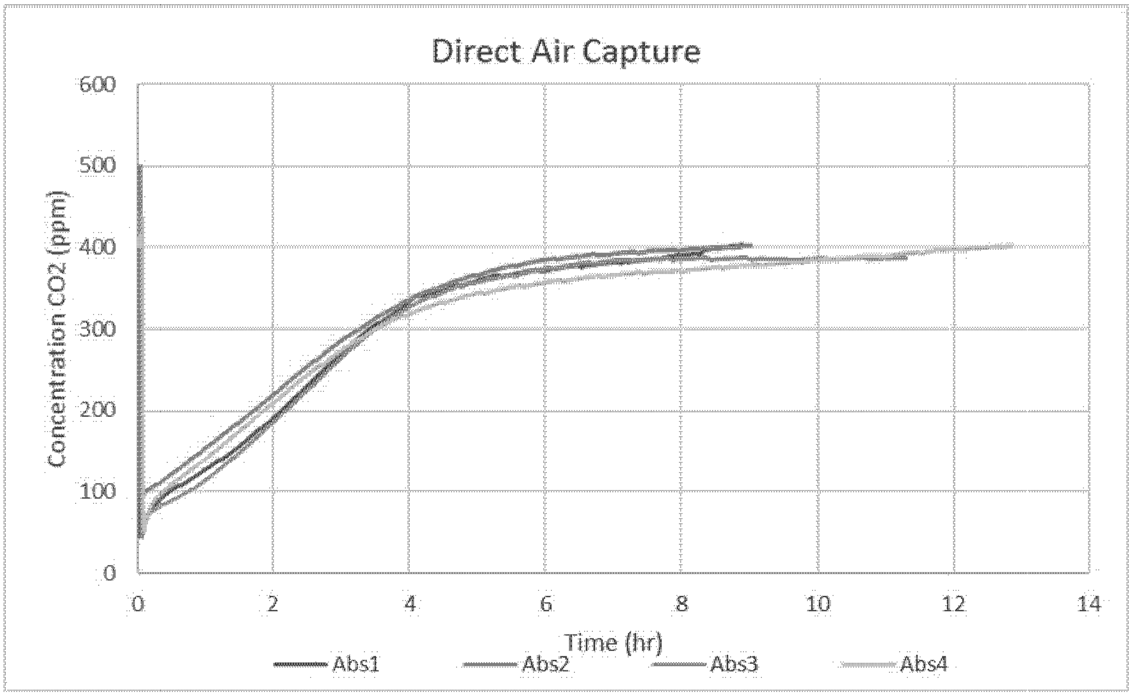
FIGS. 13: A and B) Plot of effluent $CO_2$ concentration against time of DAC absorption and desorption hydrogel regeneration studies (9 cycles).
Figure 13B:
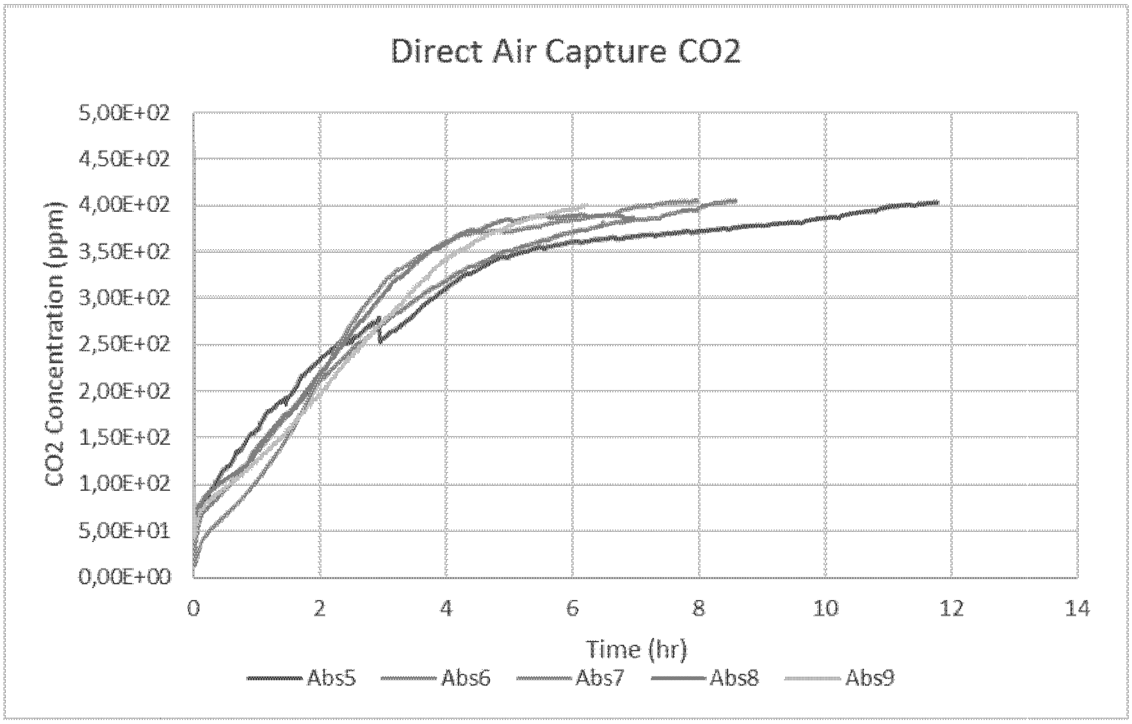

The concentration was then plotted against the time and shown in FIGS. 13A and 13B. The ten cycles were divided across the two graphs. The decrease and increase of the $CO_2$ concentrations can be seen. In FIG. 13A, first the concentration drops to almost 0, approximately on average to 20 ppm to 40 ppm. Than over the course 8-9 hours the concentration rises back to 400 ppm, highlighting the $CO_2$ capture properties. The $CO_2$ capture efficiency of the hydrogel is further highlighted by the small amount used in the regeneration experiments (1.5 gram of hydrogel). In FIG. 13B the next 5 cycles are depicted.

The amount of $CO_2$ absorbed in the regeneration experiment is provided in Table 4, highlighting that that weight increase is generally consistent across each absorption and desorption cycle.

TABLE 4

| Weight increase due to $CO_2$ absorption. | |
|---|---|
| Absorption Cycle | Weight Increase $CO_2$ (gram) |
| 1 | 0.0296 |
| 2 | 0.0263 |
| 3 | 0.0249 |
| 4 | 0.0304 |
| 5 | 0.0301 |
| 6 | 0.0284 |
| 7 | 0.0256 |
| 8 | 0.0249 |
| 9 | 0.0201 |

Example 10: Fabrication of TTE Cross-Linked PEI Snow

Another type of PEI snow was also prepared using a different cross-linker. 9.0 g of PEI~25,000 aqueous solution with mass concentration of 30.0 wt. % was added into a 20 mL plastic sample vial. Subsequently, varying amounts of trimethylolpropane triglycidyl ether (TTE) (also known as trimethylolpropane triglycidyl ether) were dissolved into 1.0 g of methanol to prepare methanol solutions with different TTE concentrations. The two solutions were then mixed up and manually shaken to initiate the PEI crosslinking reaction at the ambient temperature. The crosslinking reaction terminated within 15 min depending on the cross-linker (TTE) concentration and eventually a bulk PEI gel was produced.

Figure 14A:
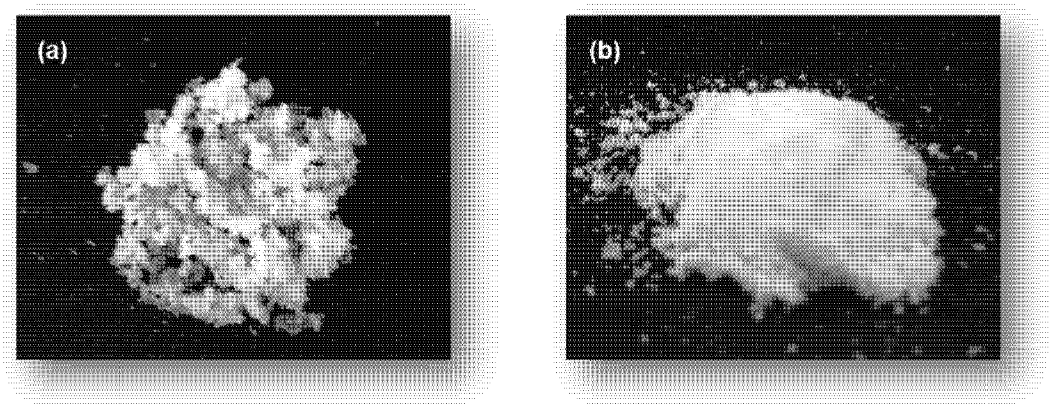
FIG. 14A: Appearance and rigidity of PEI snow with (a) 3.0 wt. %, (b) 6.0 wt. % of TTE.

Afterward, the PEI gel was vigorously ground using a glass stirring rod to obtain a snow-like material that had an average particle size of 200~300 μm (see FIG. 14A) The resulting material product was used as prepared for the subsequent characterizations and DAC measurements without pre-treated or dried, and they are virtually "dry". The TTE cross-linked hydrogels prepared are provided in Table 5:

TABLE 5

| TTE cross-linked hydrogels | | |
|---|---|---|
| PEI type | PEI conc. (wt. %) | TTE conc. (wt. %) |
| PEI (Mw~25,000) | 30 | 3 |
| | | 6 |

Figure 14B:
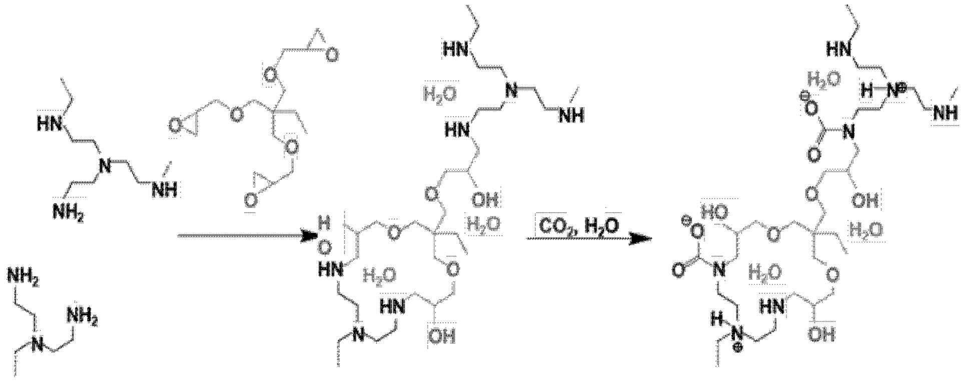
FIG. 14B: Synthesis of the TTE cross-linked PEI snow (first step) and subsequent direct air capture of $CO_2$ by PEI snow (second step).

Each TTE molecule contains three epoxide groups and as a result a dense 3-D structure of crosslinked PEI hydrogel formed, the spatial density of reactive sites within the hydrogel is increased and a greater quantity of $CO_2$ molecule can be fixed within a unit of time, contributing to a higher $CO_2$ absorption efficiency (see FIG. 14B)

Example 11: Infrared Spectroscopy of TTE PEI Crosslinking Reaction

To validate the occurrence of crosslinking reaction between PEI and TTE, mid-infrared spectroscopy measurements were made using a Vertex-70 FTIR spectrometer (Bruker) equipped with a DLaTGS detector. Data was recorded between 4000~400 $cm^{-1}$ at a resolution of 2 $cm^{-1}$ and 32 scans were averaged for each spectrum. Prior to any measurements, the surface of the ATR was cleaned with water and ethanol and wiped with laboratory cleaning tissue (Kimwipe). A new background was then recorded. PEI aqueous solution and TTE methanol solution were mixed up in a sample vial at room temperature. One drop of the mixture was quickly placed on the ATR surface and the IR measurement lasted for 20 min. All experiments were conducted at ambient temperature (20±2° C.).

Figure 15:
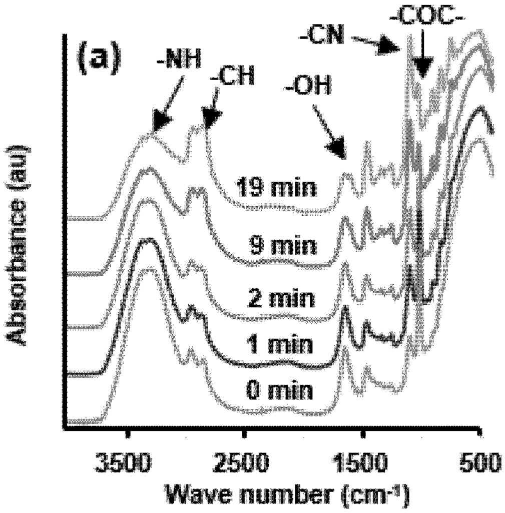
FIG. 15: IR spectrum of the crosslinking reaction between PEI and TTE over time (30 wt. % PEI-25,000 and 6.0 wt. % TTE).

FIG. 15 presents the IR spectrum of the crosslinking reaction between TTE and PEI over time. Two characteristic peaks were observed at 3350-3400 $cm^{-1}$ and 1600-1550 $cm^{-1}$ which corresponded to the —NH stretch and —NH bend vibration, respectively. Another two characteristics peaks were found at ~1640 $cm^{-1}$ and 1020-1025 $cm^{-1}$ which corresponded to the —OH bend vibration and —COC— stretch vibration, respectively. In particular, the intensity of the —COC— stretch vibration deceased with reaction time and this is consistent with the consumption of epoxide groups. It was noted that intensities of the characteristic peaks hardly varied after 10 minutes, demonstrating the fast reaction rate and the ease of preparing PEI snow, which demonstrates its potential for large-scale production. This is particularly advantageous considering the enormous volume of air that needs to be processed worldwide.

Example 14: Direct Air Capture of $CO_2$ Using TTE Cross-Linked PEI Snow

The DAC capacity of TTE cross-linked PEI snow was evaluated following the protocol outlined in Example 5. Briefly, ambient was pumped into a column that held ~15 g of PEI snow (6.0 wt. % TTE and 30 wt. % PEI) and recorded using the Isotopic Analyzer.

Figure 18:
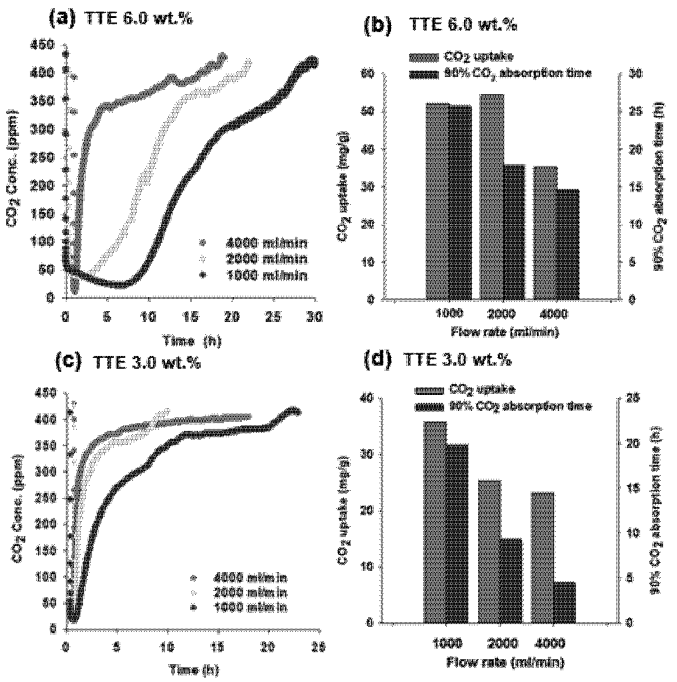
FIG. 18: Outlet $CO_2$ concentrations of the PEI snow column at various flow rates (30 wt. % PEI-25,000 and 6.0 wt. % TTE); (b) Summary of $CO_2$ uptakes and t90% of PEI snow at various flow rates (30 wt. % PEI-25,000 and 6.0 wt. % TTE); (c) Outlet $CO_2$ concentrations of the PEI snow column at various flow rates (30 wt. % PEI-25,000 and 3.0 wt. % TTE); Summary of $CO_2$ uptakes and t90% of PEI snow at various flow rates (30 wt. % PEI-25,000 and 3.0 wt. % TTE).

As one embodiment of the present invention is directed to removing $CO_2$ from industrial streams such as air-conditioning systems, reasonably high flow rates (1000, 2000, 4000 ml/min) were applied to mimic an industrial process and the outlet $CO_2$ concentrations as a function of the air injection time are illustrated in FIG. 18(*a*). Regardless of the air flow rate, the outlet $CO_2$ level decreased in the first few minutes of the air injection, demonstrating the high reactivity and capture efficiency of the material to $CO_2$ at low concentrations, which was mainly attributed to the powdery nature and high amine group density of the cross-linked PEI snow.

FIG. 18(*b*) summarizes the $CO_2$ uptake and the $t_{90\%}$ which represents the time until 90% of the maximal absorption is reached at different flow rates. Higher flow rates led to shorter $t_{90\%}$ which in some embodiments is desirable for DAC applications in industry. At lower flow rates, the $CO_2$ uptake was 52.4 and 56.7 mg $CO_2$/g hydrogel for 1000 and 2000 ml/min, respectively.

The effect of TTE concentration on the DAC performance of the PEI snow was evaluated, as shown in FIGS. 18(*c*) and (*d*). Regardless of the TTE concentration (e.g. 6.0 wt. % or 3.0 wt. %), both PEI snows absorbed $CO_2$ from the ambient air stream across all flow rates after prolonged contact with the low $CO_2$ concentration gaseous stream. The PEI snow having a lower TTE concentration had an initial faster rate of $CO_2$ absorption as indicated by the quicker increase in the $CO_2$ concentration in the effluent stream over time, however had a lower overall $CO_2$ absorption compared to the PEI snow with a higher TTE concentration (the $CO_2$ uptakes of PEI snow with 3.0 wt. % and 6.0 wt. % TTE at 1000 ml/min were 36.8 and 52.4 mg $CO_2$/g hydrogel, respectively).

Without wishing to be bound by theory, a lower cross-linking agent concentration (e.g. BDDE or TTE) may result in a lower number of hydroxyl groups present in the alkanolamine cross-linker within the PEI hydrogel, which may promote the $CO_2$/amine interactions during DAC. However, if the cross-linking agent concentration was too high, a large number of amine groups may consumed during cross-linking of the PEI hydrogel thereby reducing the number of the reactive sites for $CO_2$. Therefore, in some embodiments, to gain maximum $CO_2$ absorption efficiency, the inventors have surprisingly identified that an optimal cross-linker concentration can be determined as a function of PEI molecular weight, PEI solution concentration, cross-linker structure and/or $CO_2$/amines reaction mechanism.

Figure 21:
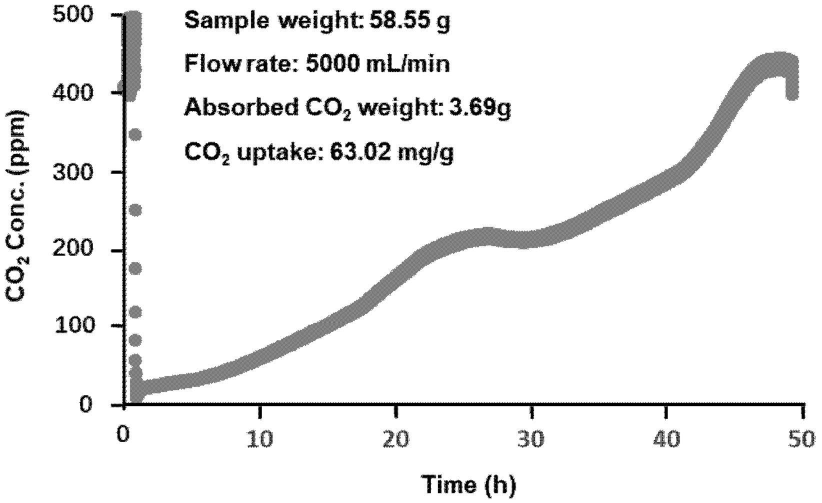
FIG. 21: DAC performance of TTE cross-linked PEI snow at large bench scale. (Insert) the main inputs and outputs of the DAC experimental conditions.

The cross-linked PEI snow demonstrated outstanding $CO_2$ absorption when scaled up to large scale (see FIG. 21). The $CO_2$ uptake was identified to be 63.02 mg $CO_2$/g absorbent, which was outstanding considering the applied sample weight and the flow rate.

Example 15: Absorption and Desorption of $CO_2$ from TTE Cross-Linked PEI Snow (Regeneration)

The absorption and desorption of $CO_2$ from the TTE cross-linked hydrogels was investigated. Briefly, ~15 g of TTE cross-linked PEI snow was loaded into the sample column for the DAC investigation as per Example 14. After the outlet $CO_2$ concentration equaled to the atmospheric level, the column including the sample was taken off from the pipeline and hooked up to a water tank that was placed in a convective oven as described in Example 9. The heating temperature was set to be 120° C. to generate the water steam that desorbed the $CO_2$. After 30 min, the heating was terminated and the column was cooled down to the room temperature. Subsequently, the steaming-heated column was subject to air flow again to evaluate the DAC capacity of the regenerated PEI snow. Ten absorption-desorption cycles were performed in total.

Figure 19:
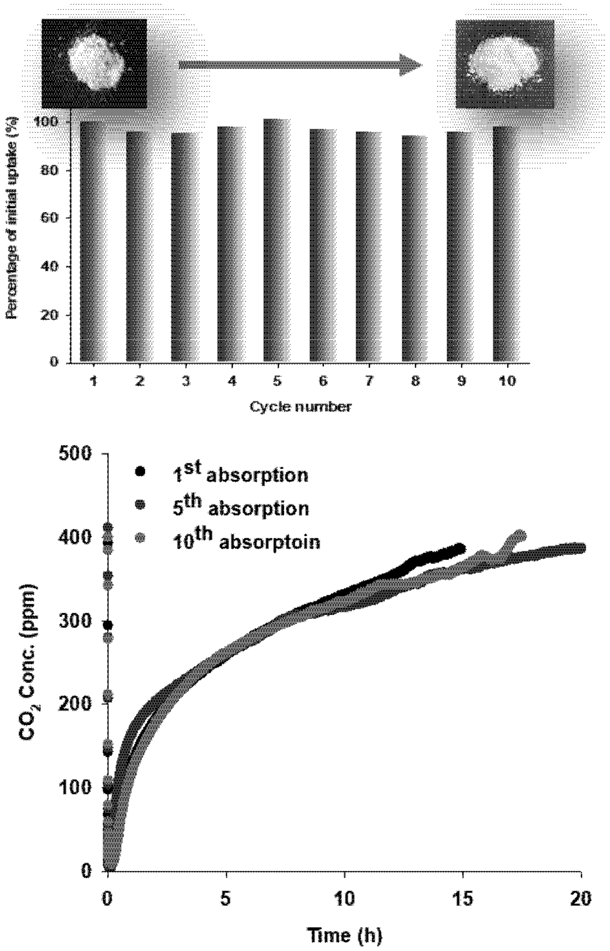
FIG. 19: (Top) Absorption/desorption (regeneration) of the TTE cross-linked PEI snow by heating with steam. Both the $CO_2$ uptake and the material appearance hardly changed after ten absorption-desorption cycles (30 wt. % PEI-25,000 and 6.0 wt. % TTE, 2000 ml/min). (Bottom) Absorption curves of first, fifth and last regeneration cycles indicating that the $CO_2$ could be completely desorbed in each cycle and that DAC capacity of PEI snow was not compromised by the steaming heat.

Then absorption/desorption cycles were performed to evaluate the recyclability of TTE cross-linked PEI snow for DAC processes. As shown in FIG. 19 (top), the DAC capacity of the PEI snow remained consistent after ten cycles, demonstrating the effectiveness of steam regeneration. The absorption curves of several representative experiments were also consistent during the regeneration process (FIG. 19 (bottom)) which highlights that the absorptive capacity of the cross-linked PEI is maintained. Additionally, the appearance and powdery nature of PEI snow were well maintained, indicating the robustness of the PEI snow upon multiple cycles (see FIG. 19 (top)).

Figure 20:
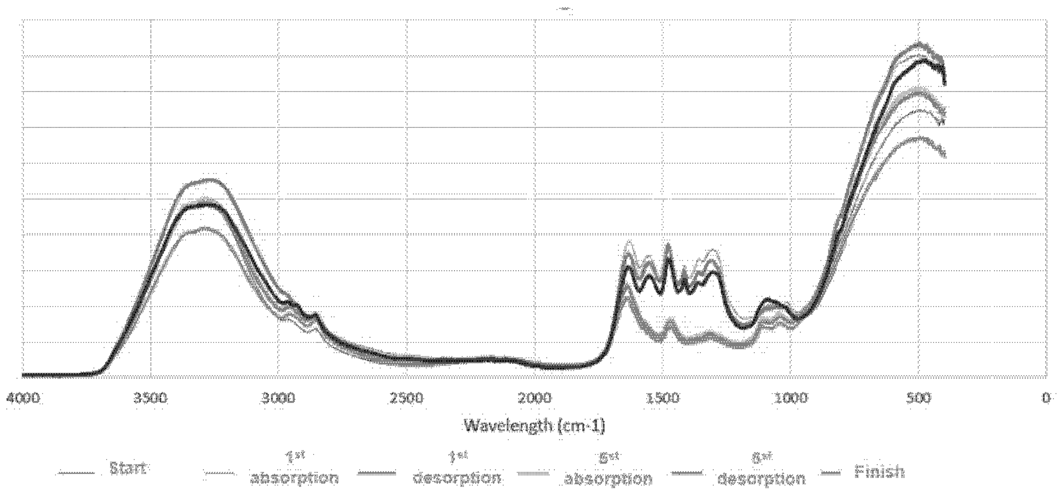
FIG. 20: IR spectrum of the $CO_2$ absorption and desorption by TTE cross-linked PEI snow in multiple cycles.

Referring to FIG. 20, the pristine PEI snow was first scanned by the IR (indicated as "Start"). After the $CO_2$ absorption in the first cycle (indicated as "$1^{st}$ absorption"), a few new peaks appeared, demonstrating the effective $CO_2$ absorption. Then the $CO_2$-loaded sample was subject to the steaming heat and it was found the IR peaks nearly overlapped that of the pristine sample. The fifth cycle repeated the same trend. After the steaming heat in the tenth cycle (indicated as "Finish"), it was seen that no new peaks appeared, demonstrating that the chemical structure of PEI snow was minimally affected by the steaming heat because no thermal and oxidative degradation occurred in ten cycles. This demonstrates that the chemical structure of the cross-linked PEI snow was minimally affected through the regeneration process, unlike which the recyclability of some other commercial amine-based $CO_2$ absorbents (e.g. liquid amines) which are normally degraded during regeneration.

Alternatively, the cross-linked PEI snow can also be regenerated with a dry heat. The inventors have identified that such dry heat may induce a small loss of water from the hydrogel over time, and the introduction of steam as the heat may maintain the water content of the hydrogel due to the introduction of moisture during regeneration. However both dry heat and steam have been shown as effective desorption environments.

Example 16: Direct Air Capture with Polyacrylamide-Based Hydrogels

Along with polyamides, polyacrylamides, copolymers and derivatives thereof can also be used in DAC. Various polyacrylamide hydrogels can be used including polyacrylamide-co-acrylic acid (PAM-co-AA) partial sodium/potassium salts (Dulux group), poly(acrylamide-co-methylenebisacrylamide) beads (Bio-Gel® P Polyacrylamide beads), and water storage crystals (poly(acrylamide-co-acrylic acid) partial potassium salt; Eden Brand).

The hydrogel was prepared by absorbing a liquid swelling agent comprising diethanolamine (DEA) or mixtures of DEA and ethylene glycol (EG) into the polyacrylamide hydrogel. The exact ratio of polyacrylamide hydrogel to liquid swelling agent can vary, however in this example, a 30% DEA in ethylene glycol liquid swelling agent was used. About 2 g of the liquid swelling agent comprising DEA was mixed with about 0.3 g of polyacrylamide-based hydrogel. The hydrogel was then placed in an oven at 60° C. for 30 minutes to allow the solution to absorb into the polymer which was stirred after 15 minutes to facilitate absorption.

The DAC was measured according to Example 5, and were shown to effectively remove $CO_2$ at dilute concentrations. Briefly, the DAC measurements were performed by packing an approximately 1 m length of ½" outer diameter tubing with the cross-linked polyacrylamide-containing polymer and then flowing 10 standard L/m of air at pressure ranging from ambient to 3 bar through this packed column.

Figure 22:
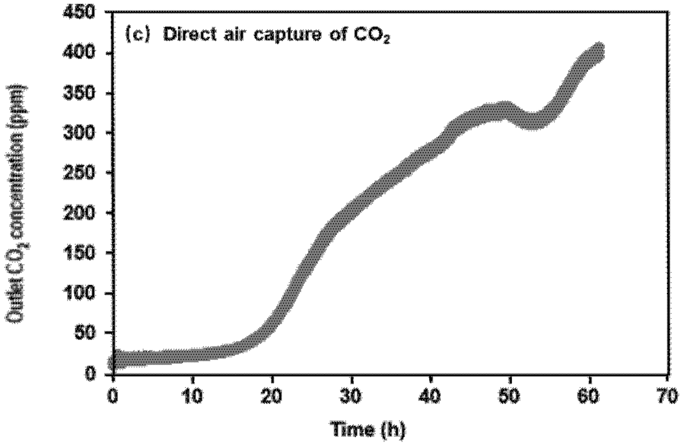

Using an in-line calibrated cavity ring-down IR spectrometer, $CO_2$ concentrations as low 20 ppm were measured in the effluent gas highlighting $CO_2$ capture efficiency exceeding 95%, initially (see FIG. 22. Over time, as the polyacrylamide hydrogel reacts with $CO_2$, the concentration increases to ambient levels and then the column can be re-generated using heat or heat/steam as described above.

Other liquid swelling agents comprising only diethanolamine (DEA), or a mixture of diethanolamine (DEA) or 2-piperidineethanol (PE) with either water or ethylene glycol (EG) were also incorporated into the polyacrylamide hydrogels described herein and their $CO_2$ capture efficiency tested.

Example 17: Direct Air Capture with PEI Snow Swollen Glycol/DEA

Direct air capture using hydrogels swollen with glycol and DEA (40% DEA in ethylene glycol) The same procedure was followed from Example 1 but the glycol/DEA swelling solvent was added by either (1) drying the aqueous PEI using a vacuum oven and re-swelling in the target solvent; or (2) synthesizing the PEI snow in the alternative solvent (glycol DEA) so dissolving the starting materials in the target solvent.

The glycol/DEA swollen cross-linked polyamine hydrogel (PEI snow) was packed into a 1.5 metre column, and ambient air was flowed through the swollen hydrogel at a flow rate of 20 L/min. The $CO_2$ concentration in the effluent stream was measured following the protocol in Example 5. The capture efficiency exceeded 85% on initial exposure to the stream of ambient air with a $CO_2$ capacity 4-6% w/w (wet weight basis) with an amine efficiency of 2-3 mmol $CO_2$/g amine (9-13% w/w) as the liquid swelling agent was investigated.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A direct air capture (DAC) process for removing carbon dioxide ($CO_2$) from an ambient air stream, comprising:

contacting the ambient air stream with a swollen hydrogel to absorb $CO_2$ from the ambient air stream resulting in an effluent air stream, wherein the swollen hydrogel comprises a cross-linked polyamine or copolymer thereof, wherein the polyamine or copolymer thereof is cross-linked with a cross-linking agent to provide a polymeric network comprising amine groups for absorbing at least some of the $CO_2$, wherein the cross-linking agent comprises two or more epoxides, and wherein the swollen hydrogel is swollen with a liquid swelling agent selected from the group consisting of alcohols, polyol compounds, glycols, alkanolamines, alkylamines, alkyloxyamines, piperidines, piperazines, pyridines, pyrrolidones, polyethylene glycol-dimethyl ethers (Selexol), N-methylpyrrolidone, propylene carbonate, sulfolane, imidazoles, ionic liquids, and combinations thereof, for absorbing at least some of the $CO_2$.

2. The process according to claim 1, wherein the polyamine is a polyalkylenimine.

3. The process according to claim 2, wherein the polyalkylenimine is polyethylenimine (PEI).

4. The process according to claim 1, wherein the cross-linking agent is a diepoxide or a triepoxide.

5. The process according to claim 1, wherein the swollen hydrogel has a swelling capacity of about 20 g/g to about 100 g/g of liquid swelling agent.

6. The process according to claim 1, wherein the swollen hydrogel comprises about 40 wt. % to about 99 wt. % liquid swelling agent.

7. The process according to claim 1, wherein the liquid swelling agent is selected from the group consisting of alcohols, polyol compounds, glycols, alkanolamines, alkylamines, alkyloxyamines, piperidines, piperazines, pyridines, pyrrolidones, and combinations thereof.

8. The process according to claim 1, wherein the liquid swelling agent is selected from the group consisting of monoethylene glycol, polyethyleneglycol, glycerol, 2-methoxyethanol, 2-ethoxyethanol, monoethanolamine, diethanolamine, methyldiethanolamine, diisopropanolamine, and aminoethoxyethanol, and combinations thereof.

9. The process according to claim 1, wherein the contacting the ambient air stream with the hydrogel comprises passing the ambient air stream through a bed comprising the swollen hydrogel.

10. The process according to claim 1, wherein the process further comprises a regeneration recovery process to desorb the absorbed $CO_2$ from the swollen hydrogel.

11. The process according to claim 10, wherein the regeneration recovery process comprises desorbing at least a portion of the absorbed $CO_2$ from the swollen hydrogel by heating, pressure reduction, or a combination thereof.

12. The process of claim 1, wherein the swollen hydrogel has a $CO_2$ absorption capacity (in mg $CO_2$ per g of hydrogel; mg/g) of between 10 to 300.

13. The process of claim 1, wherein the ambient air stream has a flow rate of at least about 100 $cm^3$/min to about to 100,000 $cm^3$/min.

14. The process of claim 1, wherein the swollen hydrogel is provided as a film or coating layer, and contacting the ambient air stream with the swollen hydrogel film or coating layer comprises passing the ambient air stream thereon or through the film or coating layer.

15. The process of claim 14, wherein the swollen hydrogel film or coating layer is supported on or within a porous support, and contacting the ambient air stream with the swollen hydrogel film or coating layer comprises passing the ambient air stream through the porous support comprising the swollen hydrogel film or coating layer.

16. The process of claim 15, wherein the porous support is a monolith comprising a plurality of porous channels which are coated with the swollen hydrogel film or coating layer.

17. The process of claim 1, wherein the swollen hydrogel is a particulate.

18. The process of claim 4, wherein the cross-linking agent is 1,3-butadiene diepoxide (BDDE) or triglycidyl trimethylolpropane ether (TTE).

19. The process of claim 1, wherein the liquid swelling agent is a glycol.

20. The process of claim 1, wherein the liquid swelling agent is a primary amine, a secondary amine, a tertiary amine, or combinations thereof.

21. The process of claim 1, wherein the liquid swelling agent is a sterically hindered amine.

* * * * *